United States Patent
Meyuhas

(10) Patent No.: US 12,353,309 B2
(45) Date of Patent: Jul. 8, 2025

(54) SYSTEMS AND METHODS FOR ANOMALY DETECTION ON RESOURCE ACTIVITY LOGS

(71) Applicant: Zscaler, Inc., San Jose, CA (US)

(72) Inventor: Eden Meyuhas, Holon (IL)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 18/493,436

(22) Filed: Oct. 24, 2023

(65) Prior Publication Data
US 2025/0130910 A1 Apr. 24, 2025

(51) Int. Cl.
G06F 15/173 (2006.01)
G06F 11/30 (2006.01)
G06F 11/32 (2006.01)

(52) U.S. Cl.
CPC ........ G06F 11/3006 (2013.01); G06F 11/327 (2013.01)

(58) Field of Classification Search
CPC ............................ G06F 11/3006; G06F 11/327
USPC .......................................................... 709/224
See application file for complete search history.

(56) References Cited

U.S. PATENT DOCUMENTS

| | | | | |
|---|---|---|---|---|
| 7,346,803 B2* | 3/2008 | Ide | ...................... | G06F 11/0709 714/4.1 |
| 7,647,524 B2* | 1/2010 | Ide | ...................... | G06F 11/0709 709/224 |
| 8,365,259 B2* | 1/2013 | Chaudhry | ........... | H04L 63/1408 726/13 |
| 10,530,796 B2* | 1/2020 | Patterson | .............. | G06F 21/554 |
| 11,210,155 B1* | 12/2021 | Cao | ........................ | G06F 11/327 |
| 11,558,272 B2* | 1/2023 | Ranjan | ................ | G06F 11/0751 |
| 11,765,249 B2* | 9/2023 | Erlingsson | .......... | G06F 16/9024 709/224 |
| 11,770,398 B1* | 9/2023 | Erlingsson | .......... | G06F 16/3329 709/224 |
| 11,785,104 B2* | 10/2023 | Erlingsson | ............ | H04L 41/145 709/224 |
| 11,792,284 B1* | 10/2023 | Nanduri | .................. | G06F 9/542 709/224 |
| 12,160,438 B2* | 12/2024 | Herszfang | ................ | G06N 7/01 |
| 2016/0283307 A1* | 9/2016 | Takeshima | .............. | H04L 41/14 |
| 2023/0049015 A1* | 2/2023 | Zass | ....................... | G06V 20/44 |
| 2023/0052442 A1* | 2/2023 | Zass | ....................... | G06V 20/41 |
| 2023/0069088 A1* | 3/2023 | Zass | ...................... | G06F 16/686 |
| 2023/0353587 A1* | 11/2023 | Bui | ..................... | H04L 63/1416 |
| 2024/0028494 A1* | 1/2024 | Herszfang | ........... | G06F 11/3075 |

(Continued)

*Primary Examiner* — Alicia Baturay
(74) *Attorney, Agent, or Firm* — Baratta Law PLLC; Lawrence A. Baratta, Jr.

(57) ABSTRACT

The present disclosure includes systems and methods for anomaly detection on resource activity logs. Various embodiments include collecting resource activity data from a plurality of resources in a cloud environment, the resource activity data including information related to a plurality of events associated with the plurality of resources in the cloud environment; aggregating and performing one or more calculations on the resource activity data to represent the plurality of resources in vector form; determining a probability of a sequence of events to be executed by a resource of the plurality of resources based on the vector form of the resource; and determining an anomaly score for the sequence of events being executed by the resource based on the probability.

18 Claims, 28 Drawing Sheets

(56) References Cited

U.S. PATENT DOCUMENTS

2024/0386098 A1* 11/2024 Sawant ................. G06F 21/552
2024/0388606 A1* 11/2024 Mihajlovic ............... H04L 9/40

* cited by examiner

| | |
|---|---|
| 2021-08-28 21:06 | Amazon EMR cluster j-ABCDEFJ (Test Cluster) was requested at 2021-08-28 21:06 UTC and is being created. |
| 2021-08-28 21:12 | Amazon EMR cluster j-ABCDEFJ (Test Cluster) began running steps at 2021-08-28 21:12 UTC |
| 2021-08-28 21:12 | Step s-1AB (Setup hadoop debugging) in Amazon EMR cluster j-ABCDEFJ (Test Cluster) completed execution at 2021-08-28 21:12 UTC. The step started running at 2021-08-28 21:12 UTC and took 0 minutes to complete. |
| 2021-08-28 21:12 | Amazon EMR cluster j-ABCDEFJ (Test Cluster) finished running all pending steps at 2021-08-28 21:12 UTC. |
| 2021-08-28 23:39 | Step s-2AB (flink_job_testing) was added to Amazon EMR cluster j-ABCDEFJ (Test Cluster) at 2021-08-28 23:39 UTC and is pending execution. |
| 2021-08-28 23:39 | Amazon EMR cluster j-ABCDEFJ (Test Cluster) began running steps at 2021-08-28 23:39 UTC. |
| 2021-08-28 23:39 | Amazon EMR cluster j-ABCDEFJ (Test Cluster) finished running all pending steps at 2021-08-28 23:39 UTC. |
| 2021-08-29 00:35 | Amazon EMR Cluster j-ABCDEFJ (Test Cluster) has terminated at 2021-08-2 00:35 UTC with a reason of USER_REQUEST. |

FIG. 22

SYSTEMS AND METHODS FOR ANOMALY DETECTION ON RESOURCE ACTIVITY LOGS

FIELD OF THE DISCLOSURE

The present disclosure relates generally to networking and computing. More particularly, the present disclosure relates to systems and methods for anomaly detection on resource activity logs.

BACKGROUND OF THE DISCLOSURE

Currently, there is a massive immigration from on-premises networks to cloud-native networks. With enterprises utilizing cloud environments to facilitate every aspect of their business, the matter of cyber security has been significantly changed. With the massive amount of log data that these cloud environments produce, it can be significantly advantageous to utilize these logs for gaining an understanding of the behaviors of resources. By creating behavioral baseline measurements of all resources in a cloud environment, security systems can detect and alert on resources which may be acting in an anomalous manner. The present disclosure presents an anomaly detection method that is based on resource activity logs. These activity logs describe activities executed by identities in the cloud, and by performing the various steps disclosed herein, cloud security systems can have a better understanding of anomalous resource behavior.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include collecting resource activity data from a plurality of resources in a cloud environment, the resource activity data including information related to a plurality of events associated with the plurality of resources in the cloud environment; aggregating and performing one or more calculations on the resource activity data to represent the plurality of resources in vector form; determining a probability of a sequence of events to be executed by a resource of the plurality of resources based on the vector form of the resource; and determining an anomaly score for the sequence of events being executed by the resource based on the probability.

The steps can further include wherein the collecting resource activity data is performed for a preconfigured historical time span. The aggregating can include grouping the plurality of events into a plurality of some fixed size of sequenced events, for example triples, wherein each of the plurality of triples includes 3 events, or any other number of events, executed by a resource of the plurality of resources in sequence. The one or more calculations can include calculating a number of occurrences that each of the plurality of resources executed each of the plurality of triples. The sequence of events can be a triple, wherein determining the probability of the triple to be executed by the resource is based on the number of occurrences that the resource executed the triple. The probability of a sequence of events to be executed by the plurality of resources can be utilized to determine similarities between the plurality of resources in the cloud environment. Determining an anomaly score for the sequence of events being executed by the resource can be based on the probability of the sequence of events being executed by the resource and the probability of the sequence of events being executed by one or more similar resources. The steps can further include providing a graphical representation of the similarities between the plurality of resources in the cloud environment. The steps can further include performing inline monitoring of the cloud environment, wherein the inline monitoring includes collecting real-time resource activity data; determining an anomaly score for a sequence of events executed by a resource; and sending an alert based on the anomaly score being below a threshold. The resource activity data can include any of a source Internet Protocol (IP) address, an event time, and an event name, or parallel fields representing the source that executed the actions, the actions executed, and the time of the event.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 10 is a screenshot of a GUI displaying an IaC scan.

FIG. 16 is a screenshot of a GUI displaying a profile page for a specific identity.

FIG. 17 is a screenshot of a GUI displaying build-time alerting and providing guided remediation.

FIG. 18 is a screenshot of a GUI displaying run-time alerting and providing automated remediation.

FIG. 22 is a diagram of a timeline generated and presented via the present systems and methods.

DETAILED DESCRIPTION OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA), Zscaler Private Access (ZPA), and Zscaler Posture Control (ZPC) available from Zscaler, Inc., the applicant and assignee of the present application.

Example Cloud-Based System Architecture

Figure 1A:
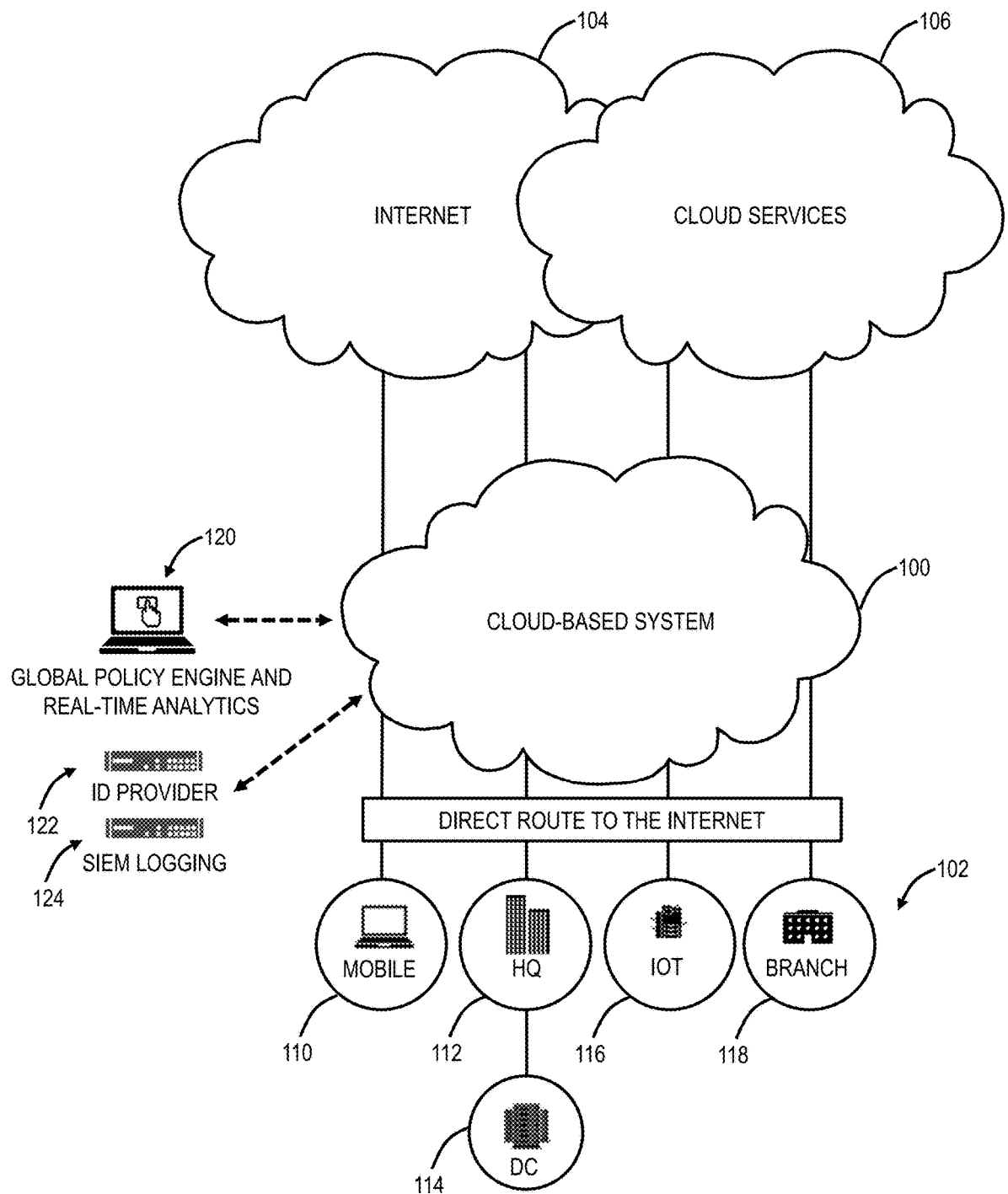
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
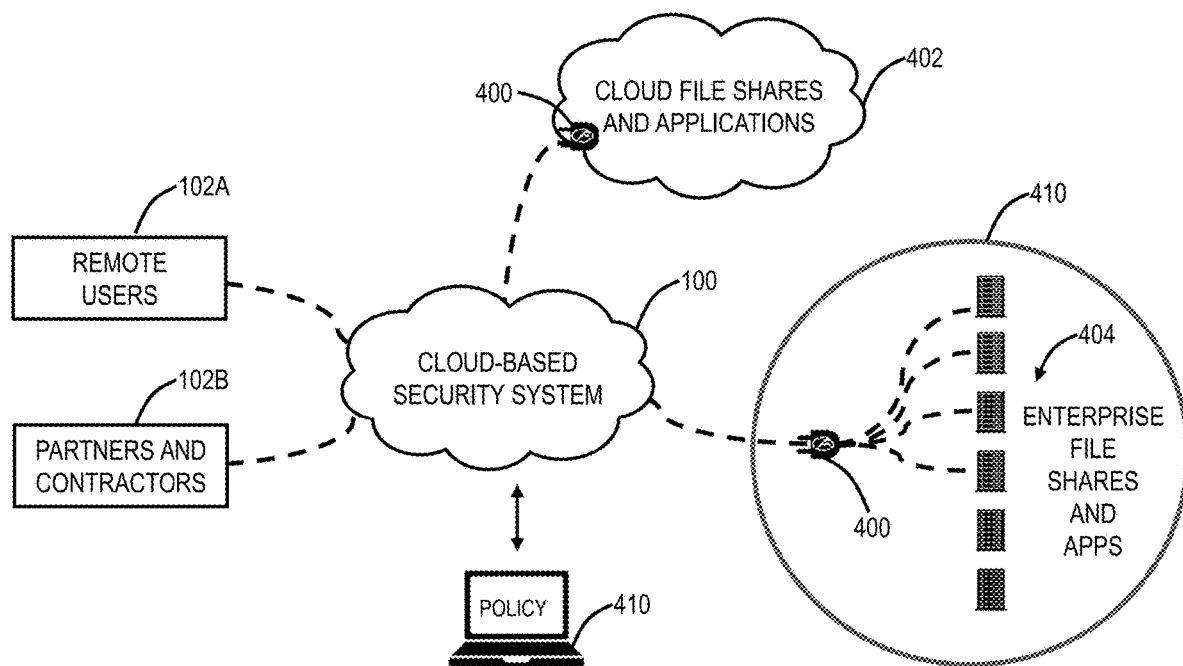
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
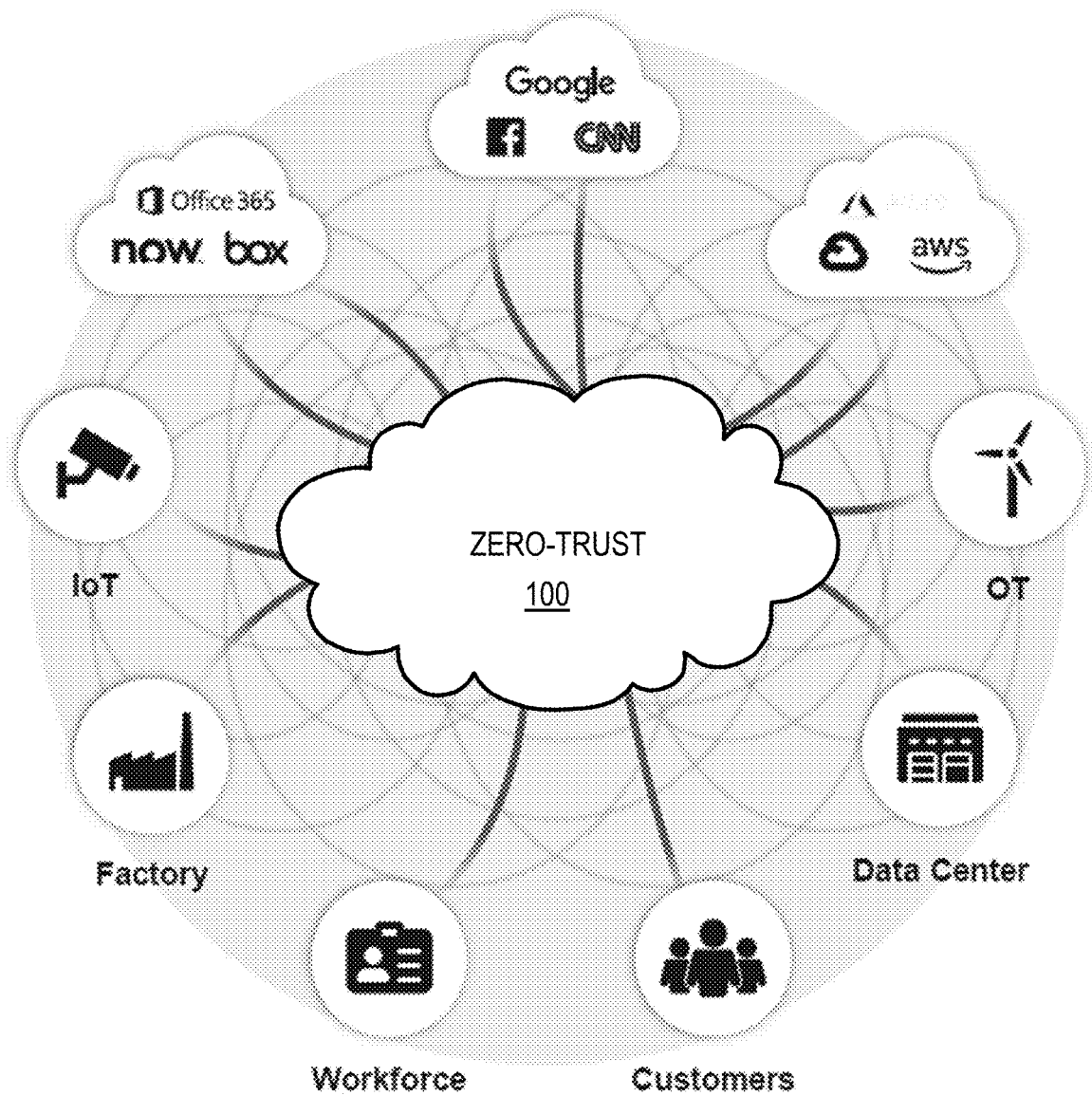
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
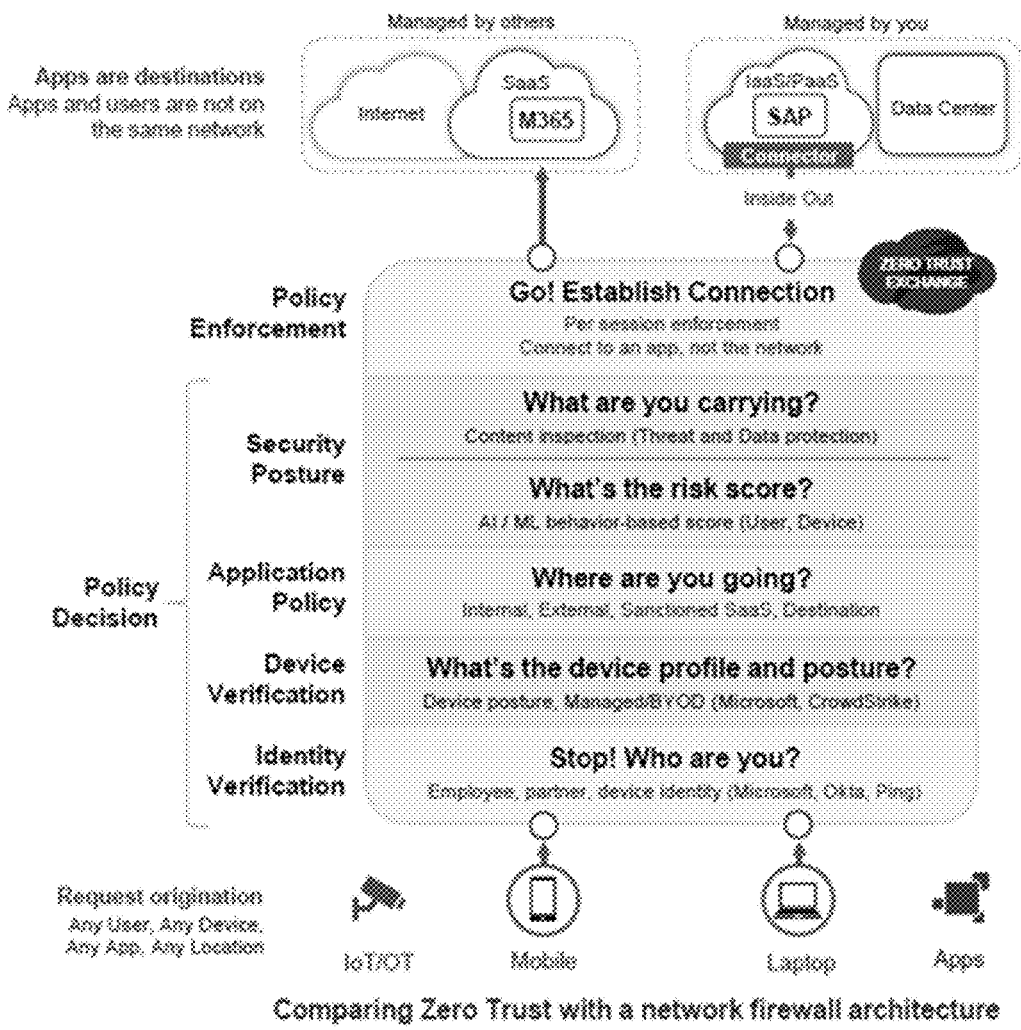
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
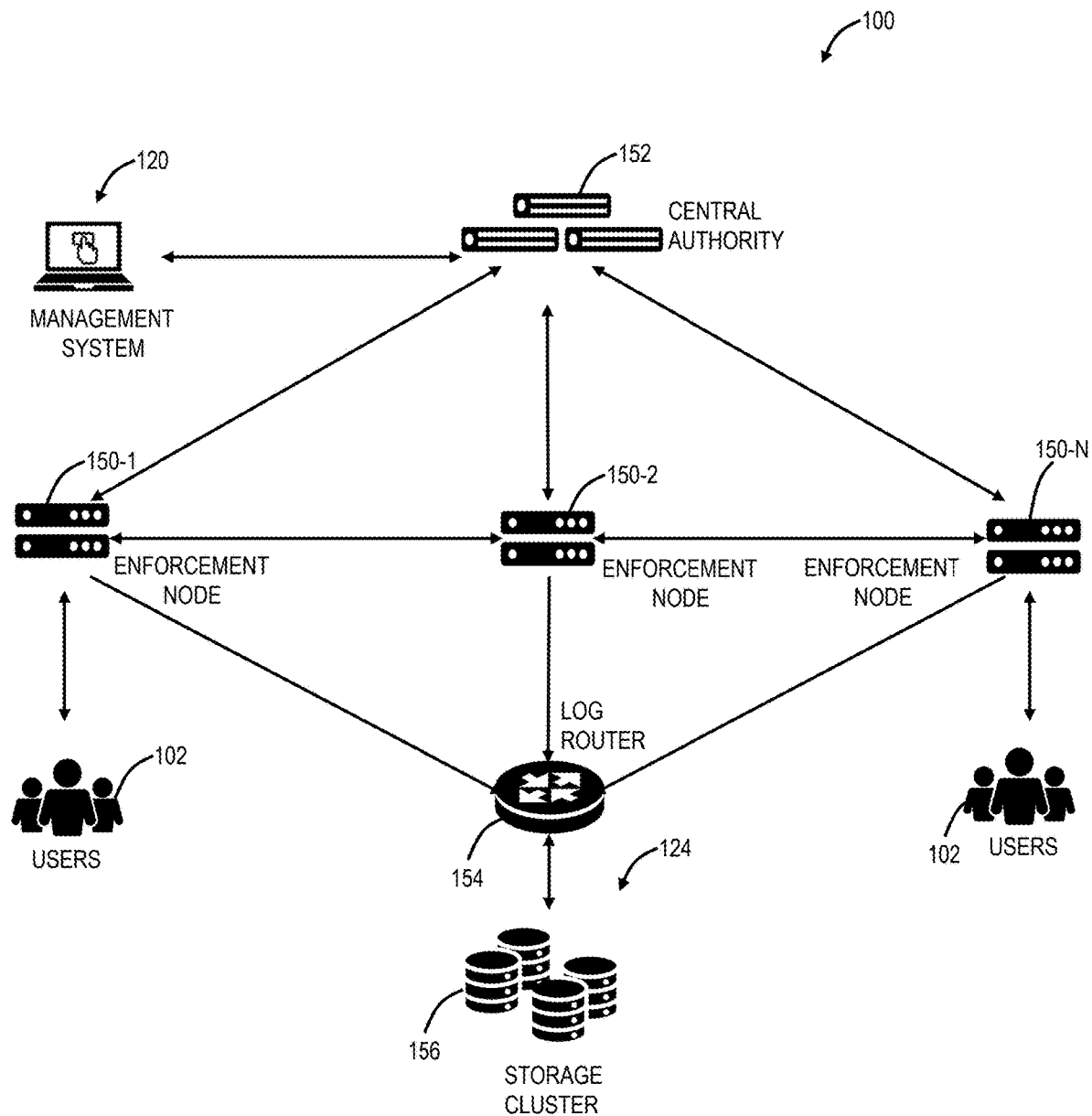
FIG. 2 is a network diagram of an example implementation of the cloud-based system.
Figure 4:
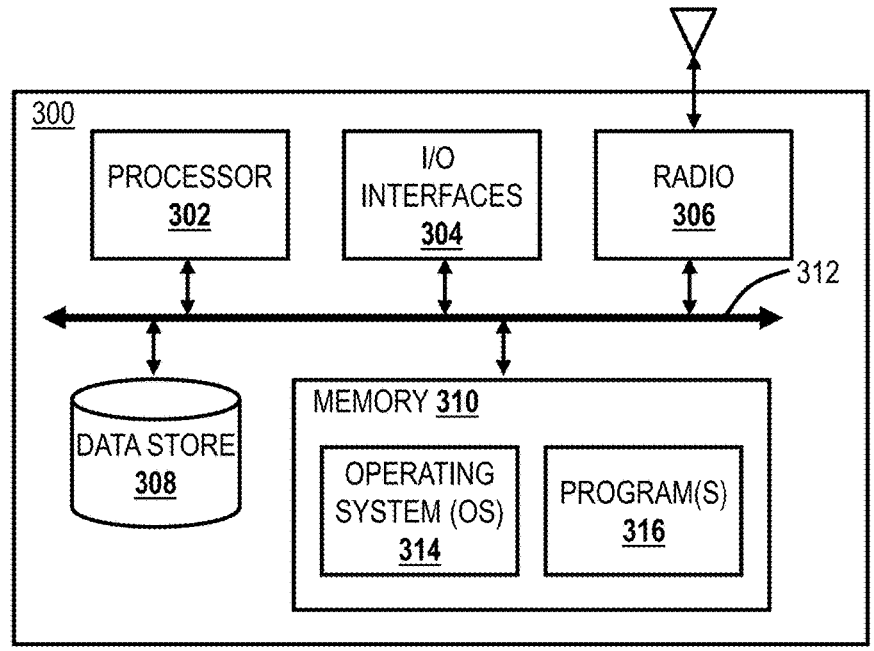

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
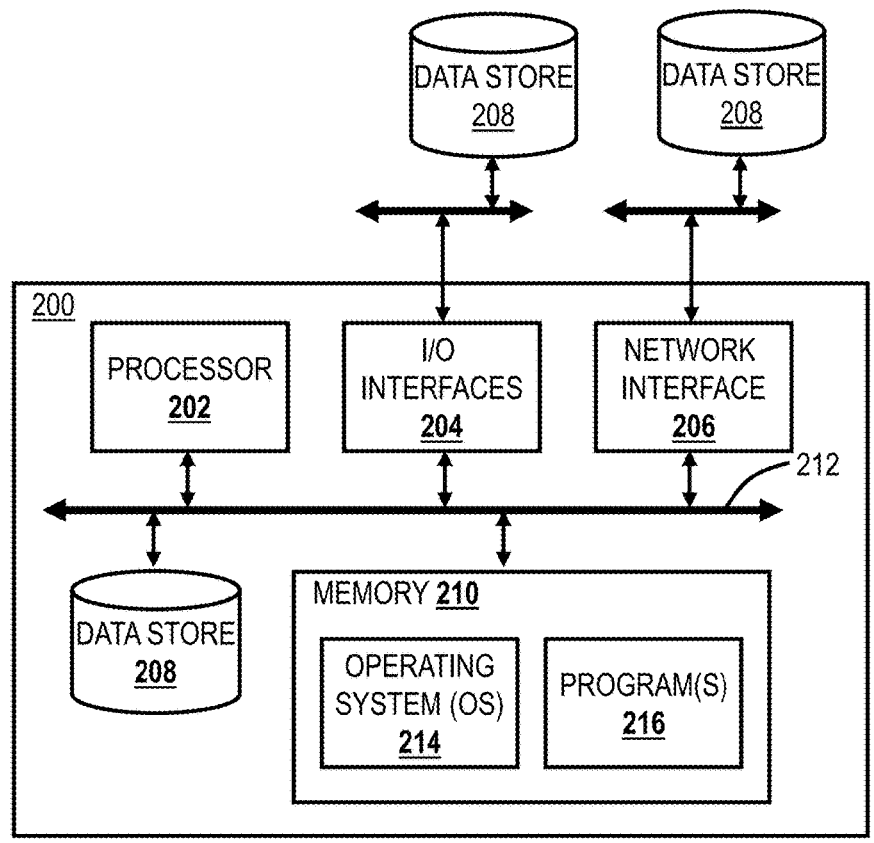
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
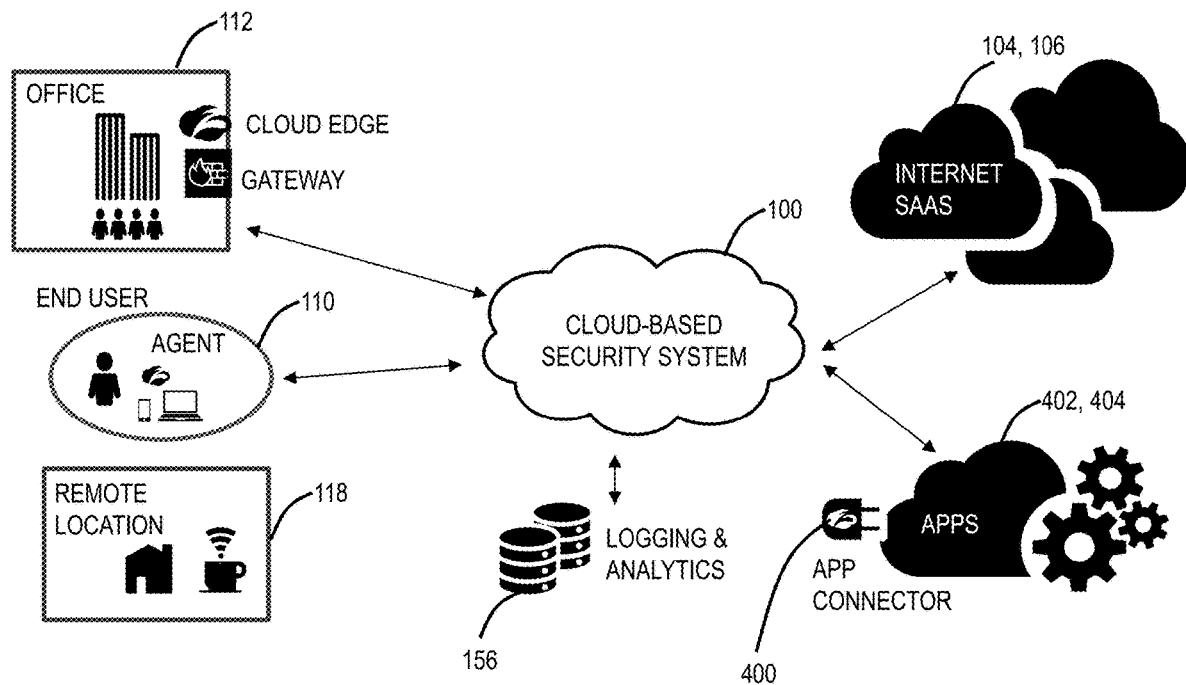
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Posture Control

The present disclosure provides systems and methods for posture control, also referred to as a Cloud-Native Application Protection Platform (CNAPP). Various embodiments provide cloud-native application security as an agentless solution that utilizes machine learning to correlate hidden risks caused by misconfigurations, threats, and vulnerabilities across the cloud-based system. Thus, security and development teams can prioritize and remediate risk associated with cloud-native applications as early as possible. Present solutions provide a comprehensive cloud security solution for all applications running on any service in the cloud-based system.

Cloud transformation introduces risks and security challenges to customers' security postures. Developers and infrastructure teams utilizing agile application development and deployment often overlook traditional security checks. Associated risks are further amplified by the fact that there can be hundreds of cloud services across a plurality of clouds, and no cloud service provider has the same capabilities. This makes it extremely difficult to maintain consistent zero trust security controls across the various clouds and workloads running in the multiple clouds.

Another issue faced by cloud security is the fact that most customers suffer from limited, or a lack of, visibility into what is running in the cloud. This includes limited visibility into where critical data is stored, what identities can access the critical data, and if any vulnerabilities exist in their code, applications, or cloud configurations. Various solutions to such problems have included bombarding operations teams with alerts, making it difficult and time-consuming to fine and resolve important issues.

Present systems and methods discover all assets for misconfiguration, vulnerabilities, and noncompliance. The use of machine learning and advanced threat correlation allows prioritization of high-impact risks. Embodiments further optimize responses with rich context, actionable information, automated guardrails, and step-by-step guided remediation. In order to comply with internal and external policies, various methods utilize preconfigured security policies and compliance libraries. Additionally, present systems can integrate with various ecosystems to enhance cross-collaboration and communication of threat remediation. A unified posture control platform can consolidate security stacks by replacing multipoint solutions with the present systems and methods.

Comprehensive coverage eliminates overhead and risk associated with disconnected point solutions by utilizing the present unified CNAPP. The unified CNAPP converges Cloud Security Posture Management (CSPM), Cloud Infrastructure Entitlement Management (CIEM), Configuration Management Database (CMDB), and Cloud Workload Protection Platform (CWPP) alongside Infrastructure as Code (IaC) security, vulnerability management, and compliance management.

Figure 7:
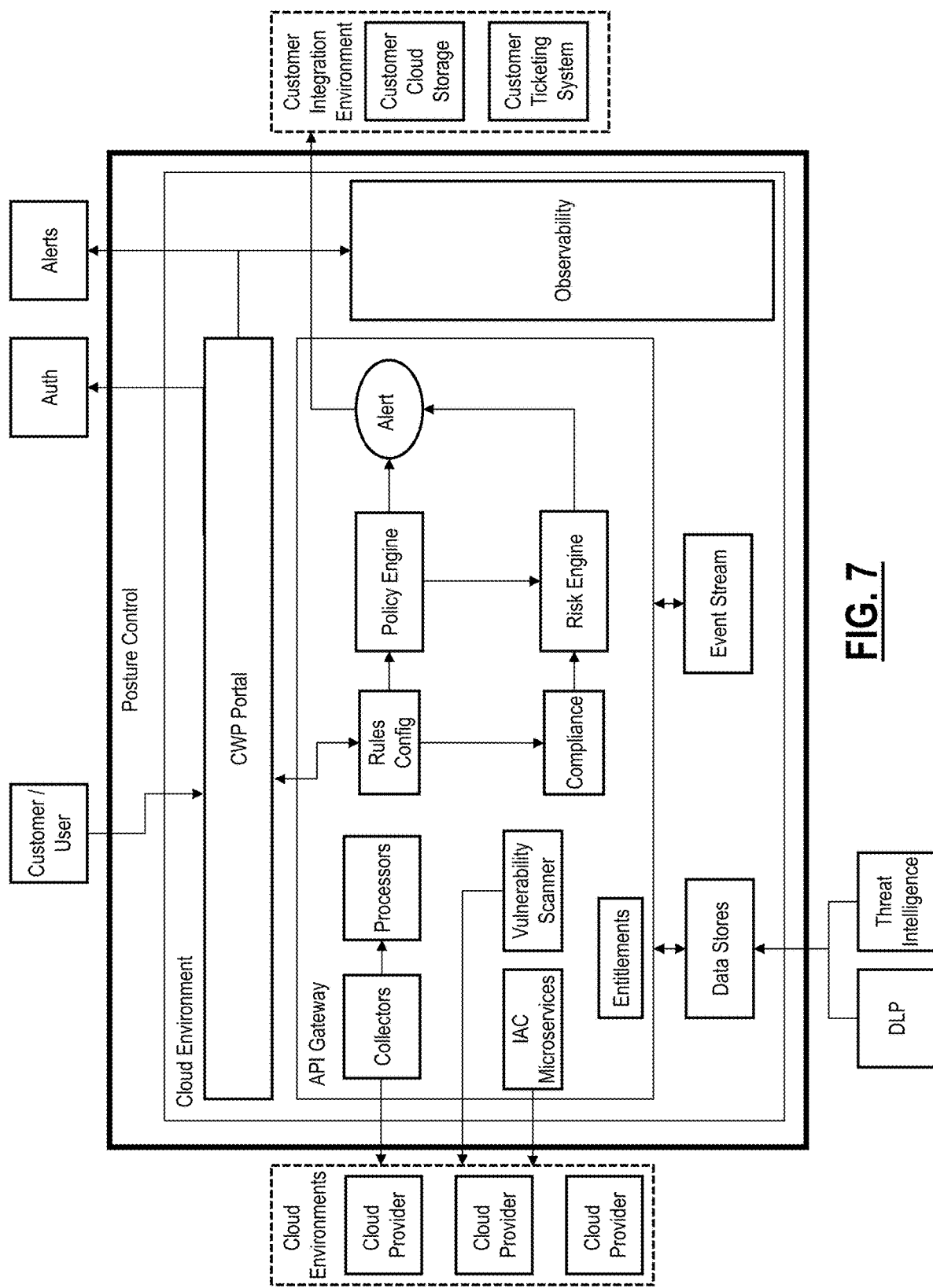
FIG. 7 is a diagram of a posture control architecture.

FIG. 7 is a diagram of a posture control architecture. Various embodiments of the posture control architecture are described herein with reference to various components depicted in FIG. 7. It will be appreciated that the examples disclosed herein are non-limiting examples, and other embodiments including other components known to one of skill in the art are also contemplated.

Various embodiments are adapted to uncover combinations of misconfigurations or activities that are seemingly low-risk in isolation, but together can create a real risk. Systems can additionally automatically prioritize correlated risks to improve Security Operations Center (SOC) efficiency and reduce alert fatigue. In order to identify and prioritize risk, embodiments of CNAPP are adapted to scan container images in registries and VMs in production environments.

Various embodiments include integration of CNAPP into development platforms (for example, VS Code), development operations tools (for example, GitHub and Jenkins), and security ecosystems (for example, ServiceNow, JIRA, and Splunk) to provide visibility, alerting, and control from early stages of builds to run stages. Similarly, embodiments of CNAPP are adapted to monitor automated deployment processes and send alerts when they identify critical security issues.

Embodiments of CNAPP can integrate with various cloud environments from a plurality of cloud providers (i.e., Amazon Web Services (AWS), Microsoft Azure, Google Cloud, etc.) and development operations tools to provide the various features of the present disclosure.

Figure 8:
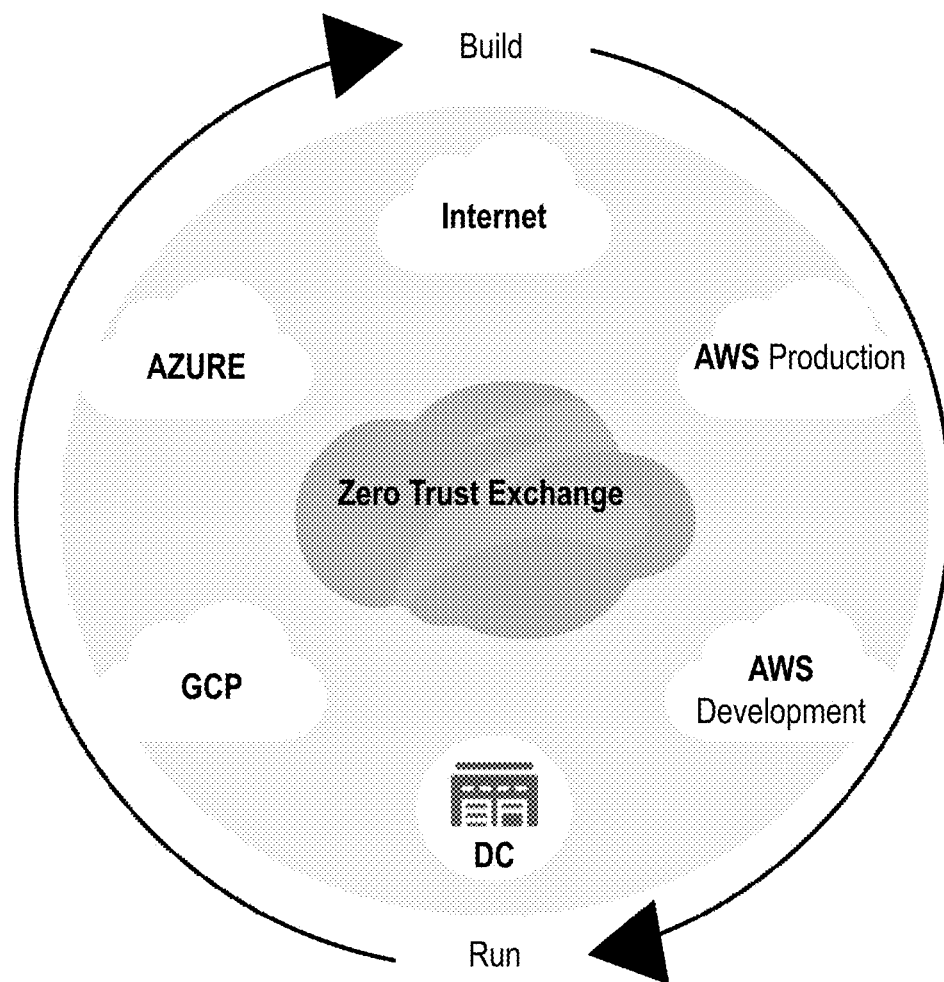
FIG. 8 is a network diagram of a zero trust architecture for providing an integrated security platform.

Again, the present disclosure provides systems and methods for posture control (CNAPP) to provide an integrated security platform from build to run. Various cloud security challenges include rapidly expanding workloads across a plurality of cloud platforms. Multiple point products and poor integrations can lead to data loss (i.e., CSPM, CIEM, IaC Scanning, DLP, etc.). Also, providing too many alerts and no context can make it difficult to identify true risk. FIG. 8 is a network diagram of a zero trust architecture for providing an integrated security platform. Posture control can provide exposure scanning to identify exposed assets and vulnerabilities (attack surfaces) and discover sensitive data. Configuration scanning allows posture control to identify and prioritize misconfigurations and identify excessive permissions for users and workloads. For example, identifying a user or workload having excessive permissions when the user or workload is deemed to be suspicious or risky. The present zero trust architecture securely connects users to applications, applications to applications, and machines to machines over any network in any location.

Discovery

Various embodiments of the posture control process include discovering raw information (posture control data) across multi-cloud and public cloud environments to produce correlative cloud security analytics. Such discovering can be a result of the scanning disclosed herein. For the discovery stage to operate, various embodiments allow onboarding and configuring of modules for automated discovery of all assets, identities, network flow logs, and activities in a particular public cloud environment. For IaC discovery, embodiments of posture control allow its customers to onboard code repositories and CI/CD tools hosted as SaaS services or self-hosted on on-premise environments. The discovery of data (i.e., assets, identities, network flow logs, activities, code repositories, CI/CD tools, configurations, etc.) can alternatively be referred to as scanning for or discovering posture control data. IaC code repositories and CI/CD environments are also referred to as build-time environments, whereas public cloud environments are referred to as run-time cloud environments. The various configurations of automated discovery can additionally be referred to as discovery modules.

Various embodiments allow configurable parameters for all discovery modules to collect changes at preconfigured intervals. Various configurable discovery module parameters include minimum time-frequency to collect ongoing changes, maximum time-frequency to collect ongoing changes, and stop collection of data in any discovery module at a preconfigured date and time. The various discovery modules enable a plurality of ways to collect (scan for) data from customers' environments and allow various modes of collection. In some embodiments, the modes of collection include APIs exposed to public cloud vendors and SaaS service providers for code repositories and CI/CD tools. Additionally, file transfers via HTTPS from public cloud storages and data lakes are also contemplated. In various embodiments, collection/scanning of data includes fully agentless scanning.

Figure 9:
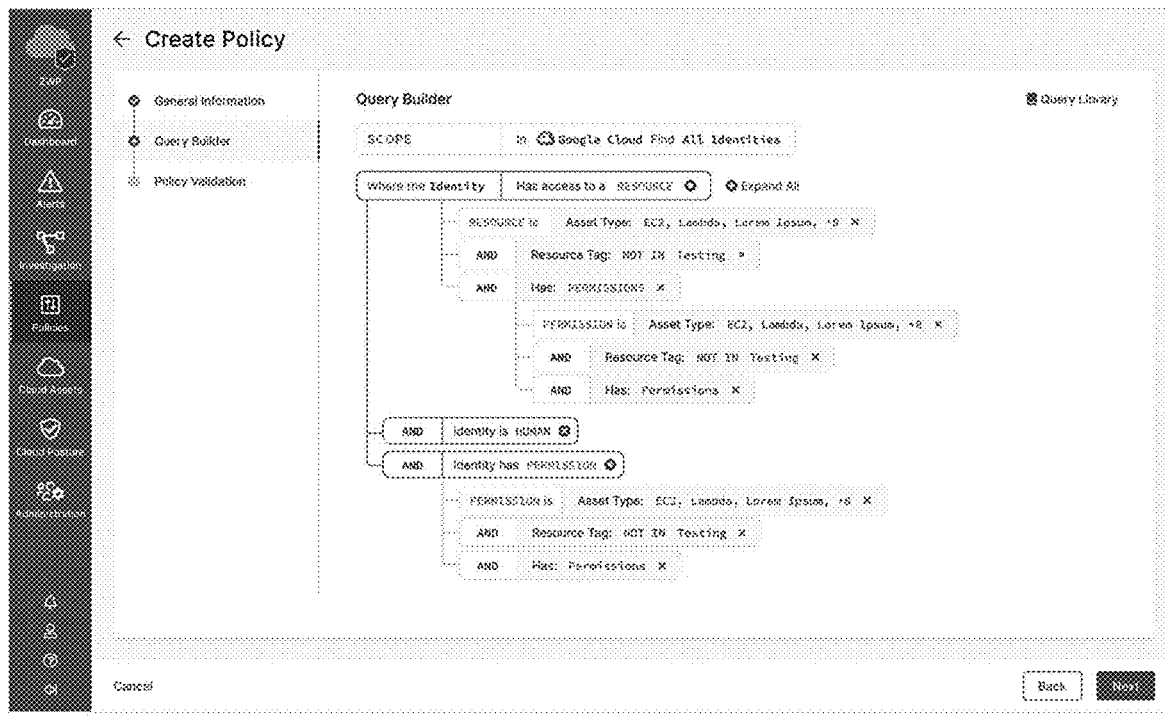
FIG. 9 is a screenshot of a Graphical User Interface (GUI) displaying an asset and identity timeline.

FIG. 9 is a screenshot of a Graphical User Interface (GUI) that can be utilized to configure policies. The various configurable parameters can be customized for specific identities, groups of identities, types of identities, identities with specific entitlements, etc. The various policies can further be a part of the discovery modules.

Findings

Figure 10:
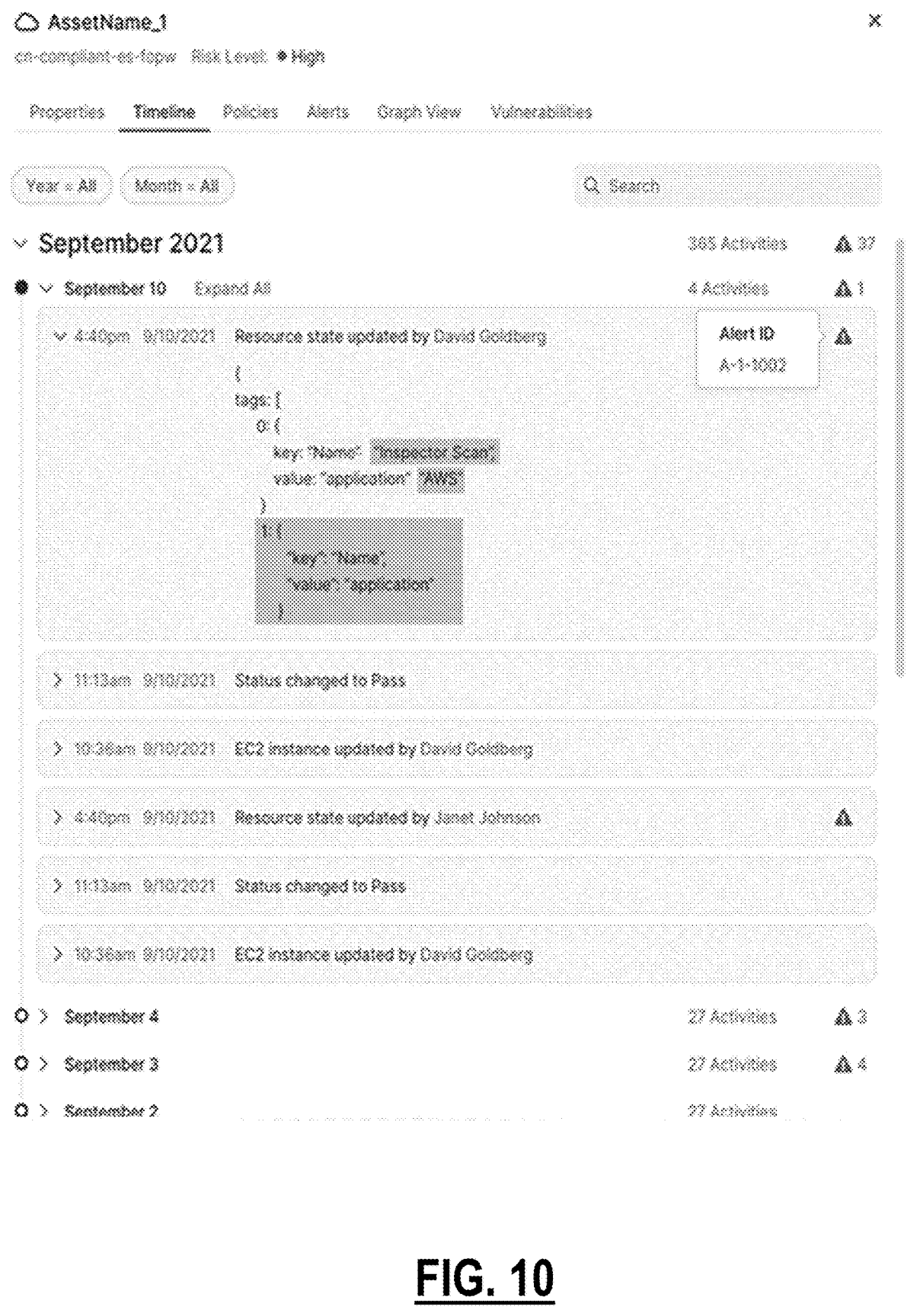

In various embodiments, multi-cloud Configuration Management Databases (CMDBs) provide current and historical configurations of all things uniquely identifiable in the public cloud (run-time cloud) environments. Historical configurations can be identified up to a preconfigured historical date (i.e., 180 days prior), while current configurations are updated in real-time. Further, various features include identifying activities performed by identities across all public cloud environments. This similarly provides a historical view of activities performed by human or non-human identities present in Identity and Access Management (IAM) catalogs of native public cloud environments. FIG. 10 is a screenshot of a GUI displaying an asset and identity timeline. The example of FIG. 10 shows a timeline of activities associated with an identity. Such visualizations can provide the ability to search assets based on tags, regions, etc. They also provide the ability to view and download metadata, understand who changed what and when, and perform investigations by correlating events with alerts. Such investigations help to understand associated assets with their relationship, understand who has access to what and how, and visualize such relationships, alerts, and vulnerabilities in graphical representation.

Additionally, cloud infrastructure entitlement management provides a relationship between human and non-human identities including their authorization permissions to perform various actions in public cloud environments.

The various data ingested from discovery modules can be aggregated to analyze transport layer communication in public clouds. Security policy findings modules can detect invalid configurations in run-time or build-time environments based on user preferences and rules enabled from pre-configurations in posture control systems.

In run-time environments, posture management can identify misconfiguration issues to provide compliance risks in the cloud. It can also be enabled to provide continuous monitoring and real-time security postures of individual compliance benchmarks based on data collected at set time intervals from the various discovery modules.

Figure 11:
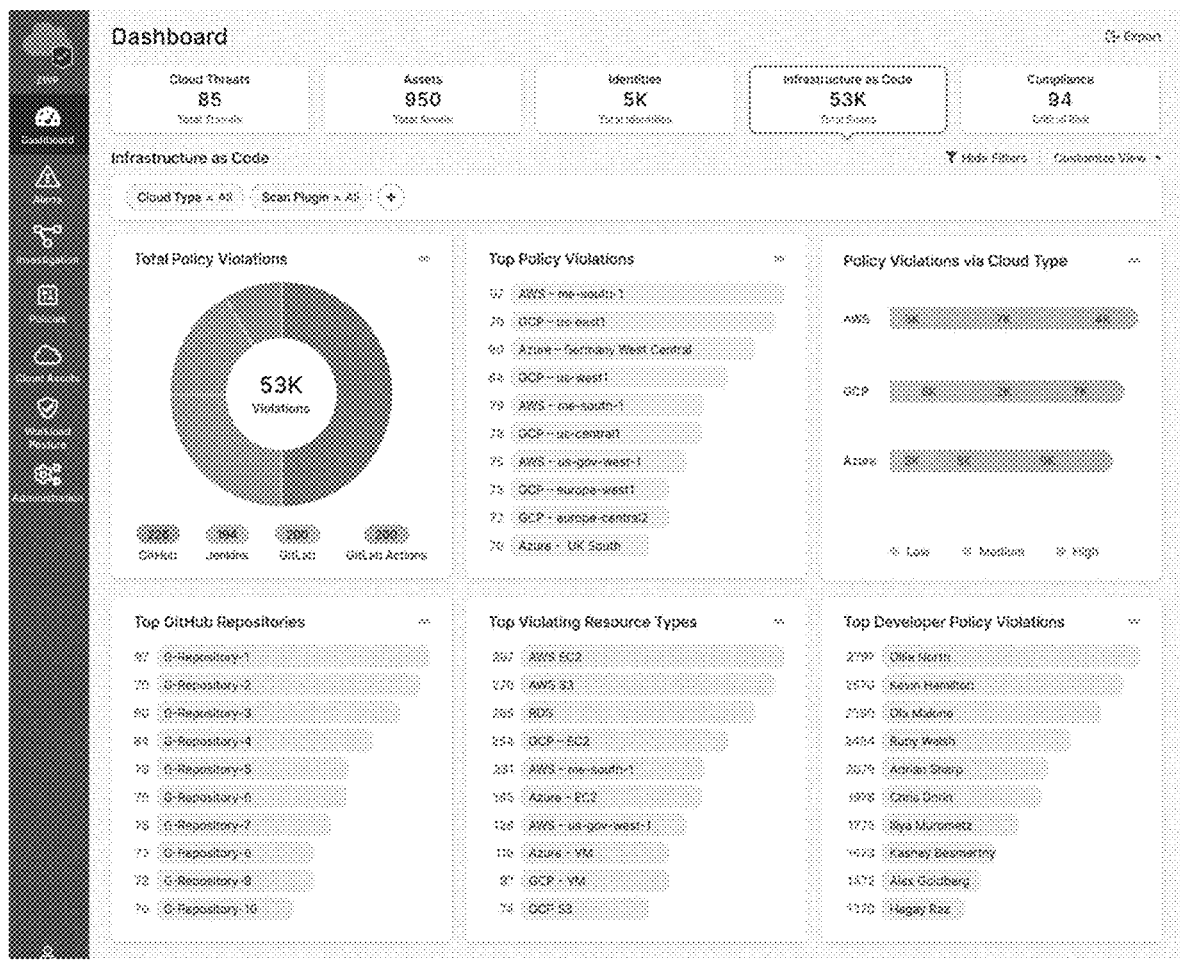
FIG. 11 is a screenshot of a GUI displaying a graphical visualization correlating relationships in a cloud environment.

Cloud security posture management identifies misconfiguration issues in build-time environments to provide compliance risks before asset/changes are deployed to the cloud environment via scripts in the code repositories. FIG. 11 is a screenshot of a GUI displaying an IaC scan. Further, posture control provides continuous monitoring and real-time security postures of individual compliance benchmarks based on the changes made in code repositories, CI/CD tools and data ingested at set intervals from the discovery modules.

Correlation

The various findings and discovery modules disclosed herein include correlated policies and alerts. Based on the invalid findings and risks determined by security policy findings, the correlated policies allow systems to generate alerts on the uniquely identifiable resources from the various multi cloud CMDBs. Alert rules can be configured as to receive a subset of required alerts on one or more configured communication channels (i.e., internet based messaging platforms, Short Messaging Service (SMS), Email, etc.).

Figure 12:
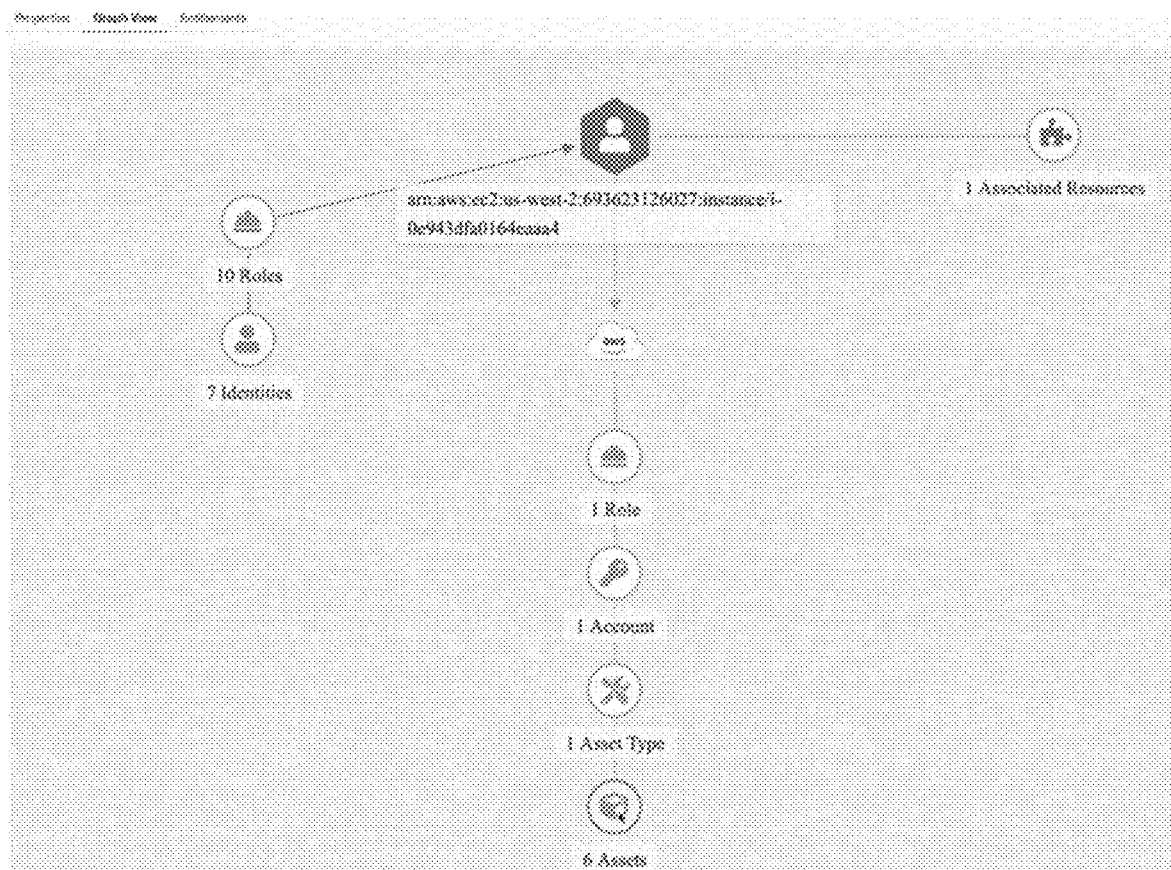
FIG. 12 is a screenshot of a GUI displaying a visualization of compliance tracking.

FIG. 12 is a screenshot of a GUI displaying a graphical visualization correlating relationships in a cloud environment. Various examples of correlated policies include an instance with powerful access permissions that is exposed to the public. Compromising such an instance can give an attacker a wide attack surface and access to resources. An attacker can gain access to the instance because it is exposed to the internet, and can thus access resources due to instance privileges. An instance such as this with high privileges has a higher impact if it is compromised. Another example includes creating credentials for a privileged service principal, which is seen as a risky activity. Various rules can detect when credentials are created for a privileged service principal, because the credentials can be used to access an account from the internet, thus bypassing authentication controls. Further, rules can detect when a bucket object level encryption key is set to an external key. If the external key is owned by an attacker, the attacker can later block access to the key and lockout the bucket owner from accessing the objects. It will be appreciated that the examples set forth in the present disclosure are non-limiting, and other rules and correlations are contemplated by various embodiments.

Analytics

Figure 13:
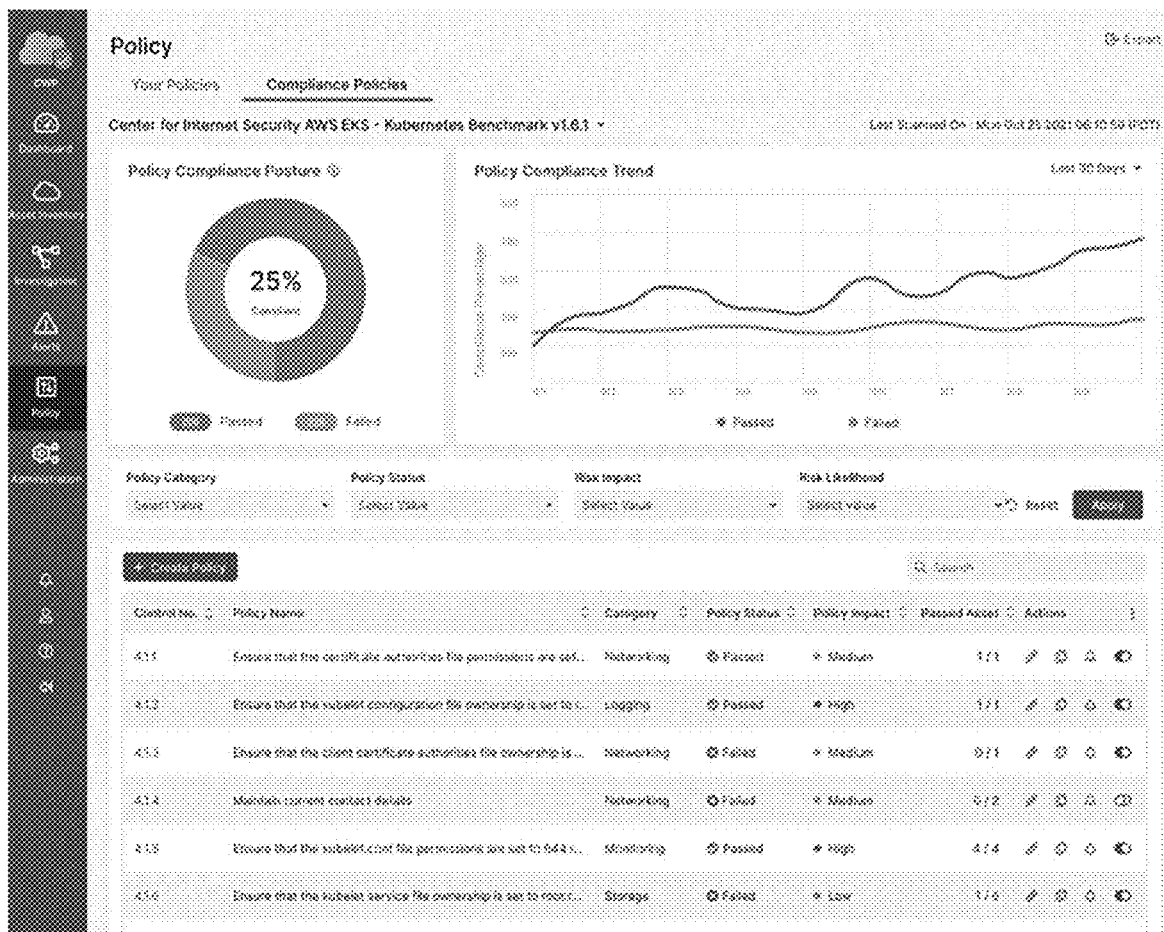
FIG. 13 is a screenshot of a GUI displaying a page for entitlement management and least-privilege enforcement.

Various embodiments of posture control can provide informative analytics which include high impact risk correlation and timelines across all discovery modules. As stated previously, embodiments of the present disclosure are adapted to monitor compliance via various compliance policies. In various embodiments, continuous compliance posture tracking takes place. FIG. 13 is a screenshot of a GUI displaying a visualization of compliance tracking. The GUI provides the ability to view the continuous tracking and graphically view policy compliance trends over a period of time. The visualization can include one or more graphs representing policy compliance posture, policy compliance trends, and the like.

Figure 14:
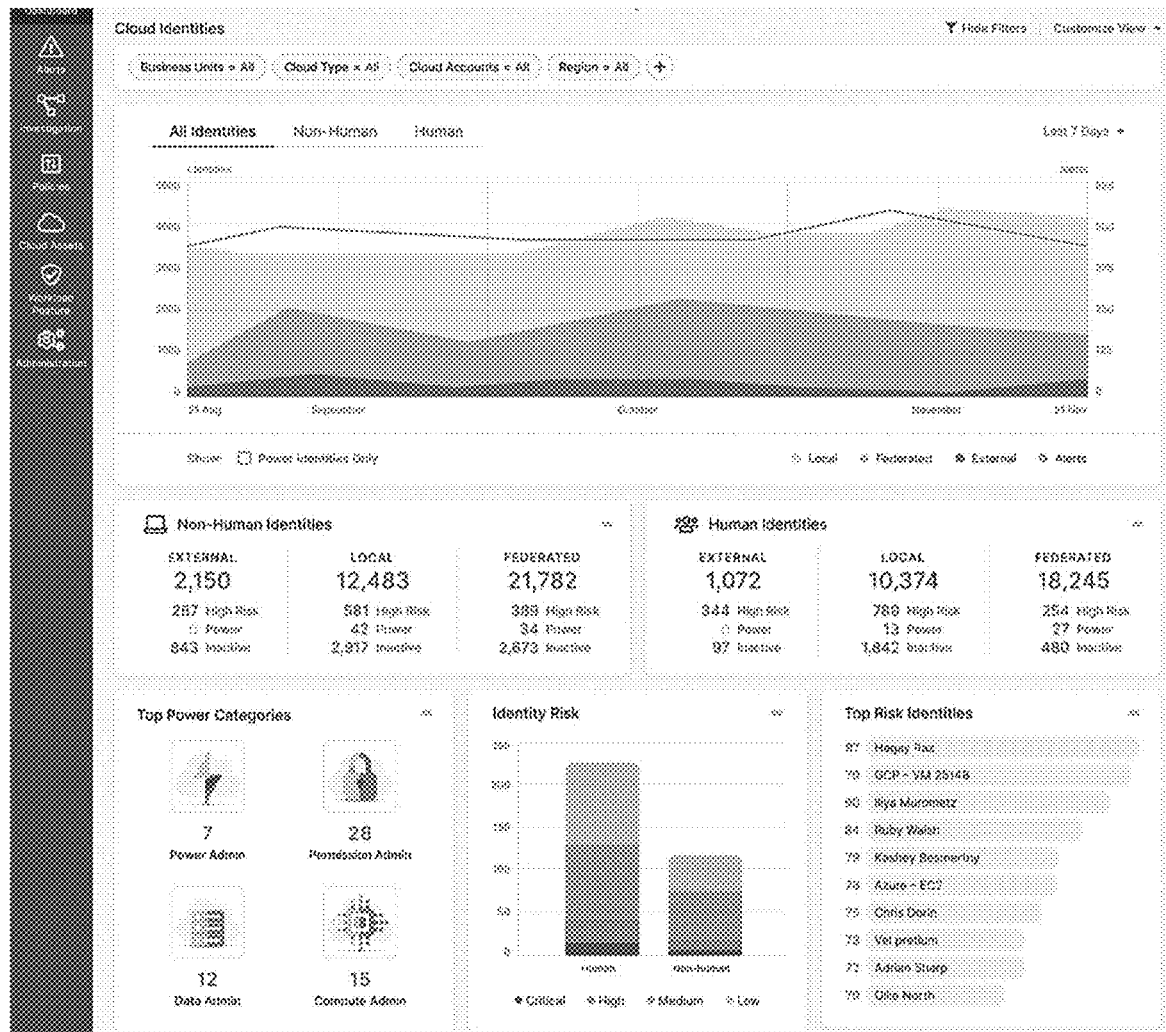
FIG. 14 is a screenshot of a GUI displaying a page for determining identity entitlements.

FIG. 14 is a screenshot of a GUI displaying a page for entitlement management and least-privilege enforcement. The data displayed in FIG. 14 includes a data enriched identity inventory for the cloud environment. This provides visibility of human and non-human identities, allows an understanding of identity origin for local/federated/external identities, and catalogs human and non-human identities by their permission levels in different accounts. Further, the data can allow easy detection of highly privileged identities and allow assessment of their permissions. All implicit and explicit entitlements can be identified. Also, excessive permissions assigned to non-human identities can be detected. A risk based prioritized view can allow visualization of only important high risk issues as well as identities which are considered high risk, thus reducing the number of alerts an operations team has to deal with.

Figure 15:
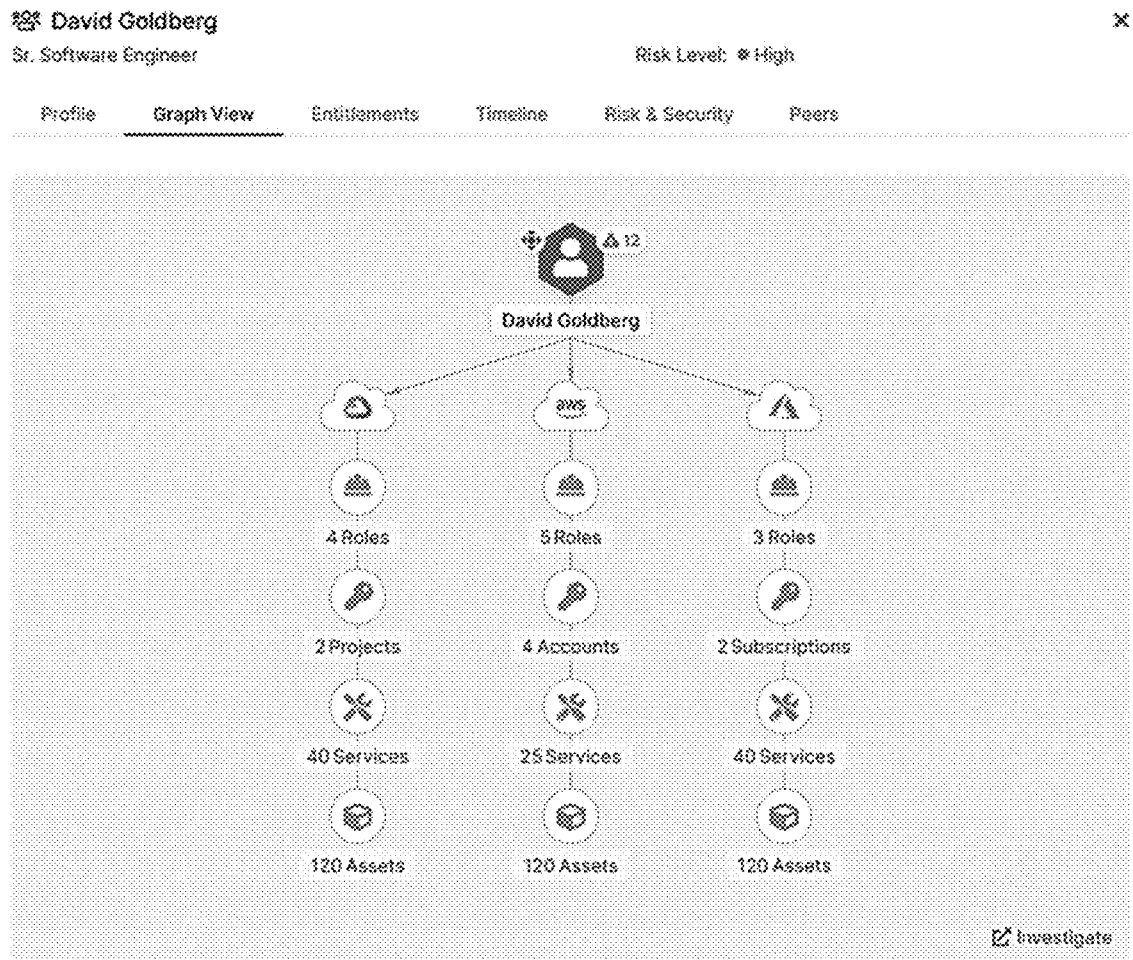
FIG. 15 is a screenshot of a GUI displaying a profile page for a specific identity.

FIG. 15 is a screenshot of a GUI displaying a page for determining identity entitlements. The identity shown in FIG. 15 can be considered a high risk identity. The identity has plurality of roles with access to multiple services and assets within multiple cloud environments. In various embodiments, an identity with such a high number of entitlements is considered high risk while other factors are considered as well.

Figure 16:
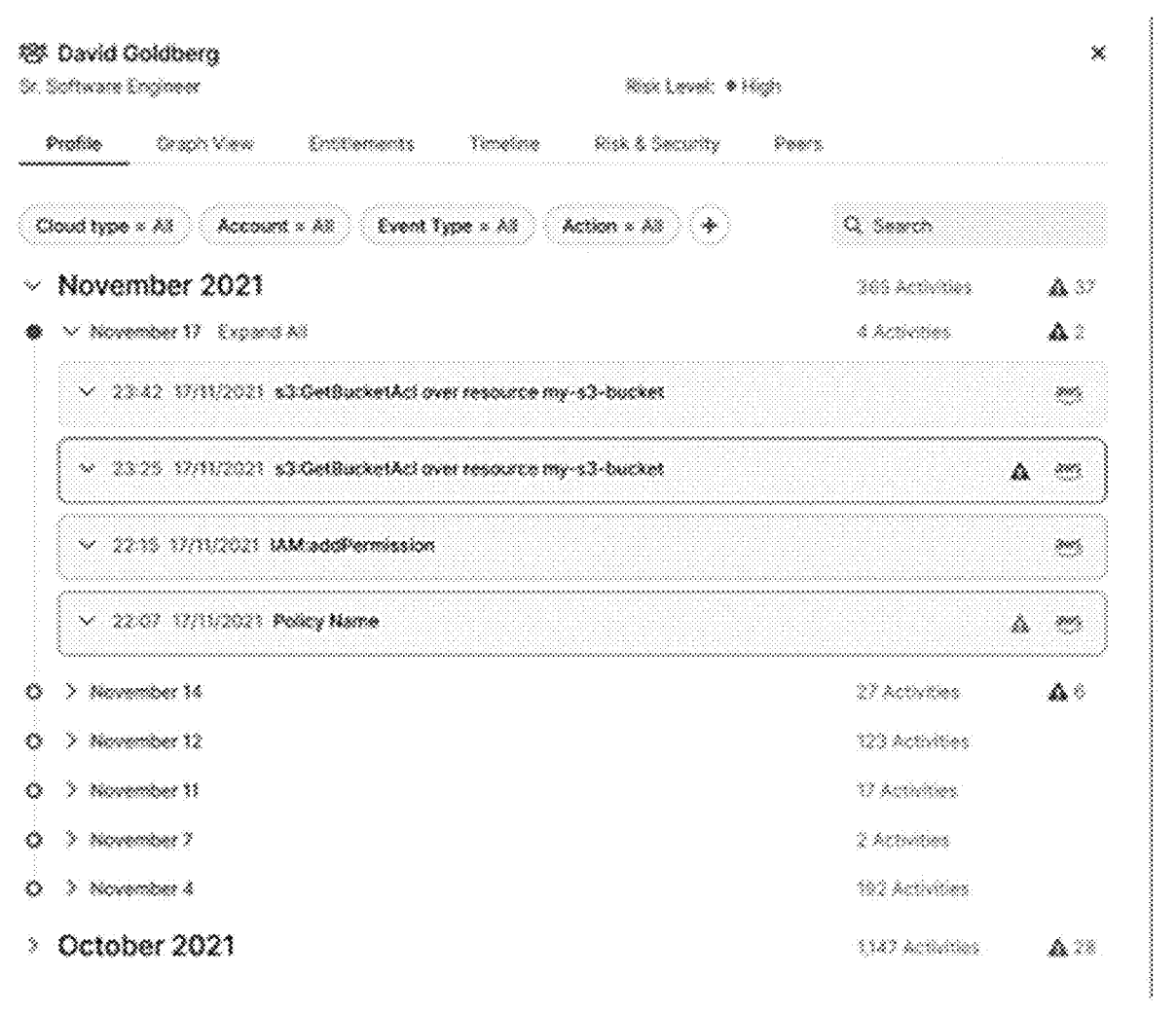

FIG. 16 is a screenshot of a GUI displaying a profile page for a specific identity. The profile page provides various data associated with the identity. The data can include an activity timeline which provides insight into activities performed by the identity, entitlement/configuration changes applied to the identity, and any resulting alerts. Such insights provide a complete picture of an activity, such as who performed the activity, what activity was performed, when was the activity performed, and how was the activity performed.

Figure 17:
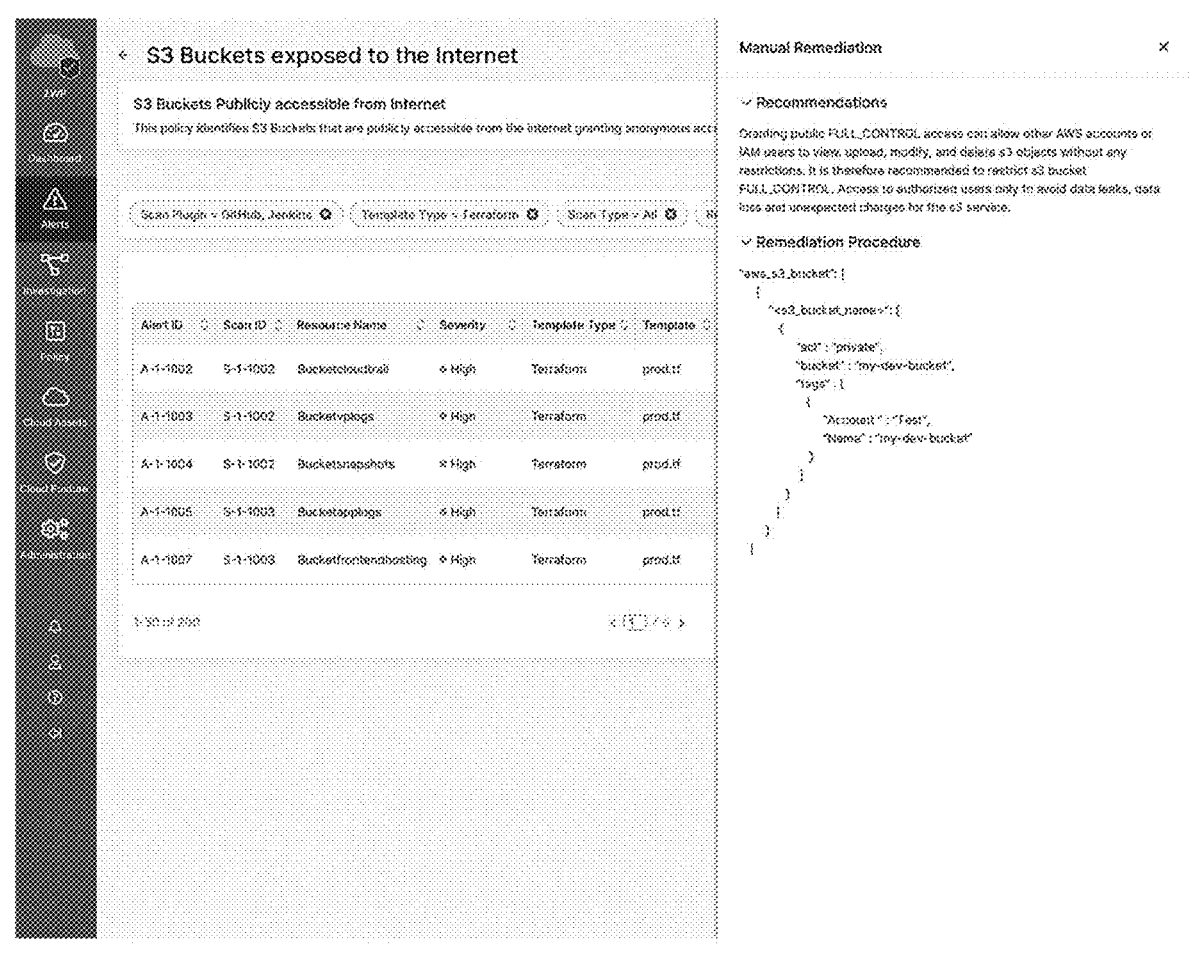
Figure 18:
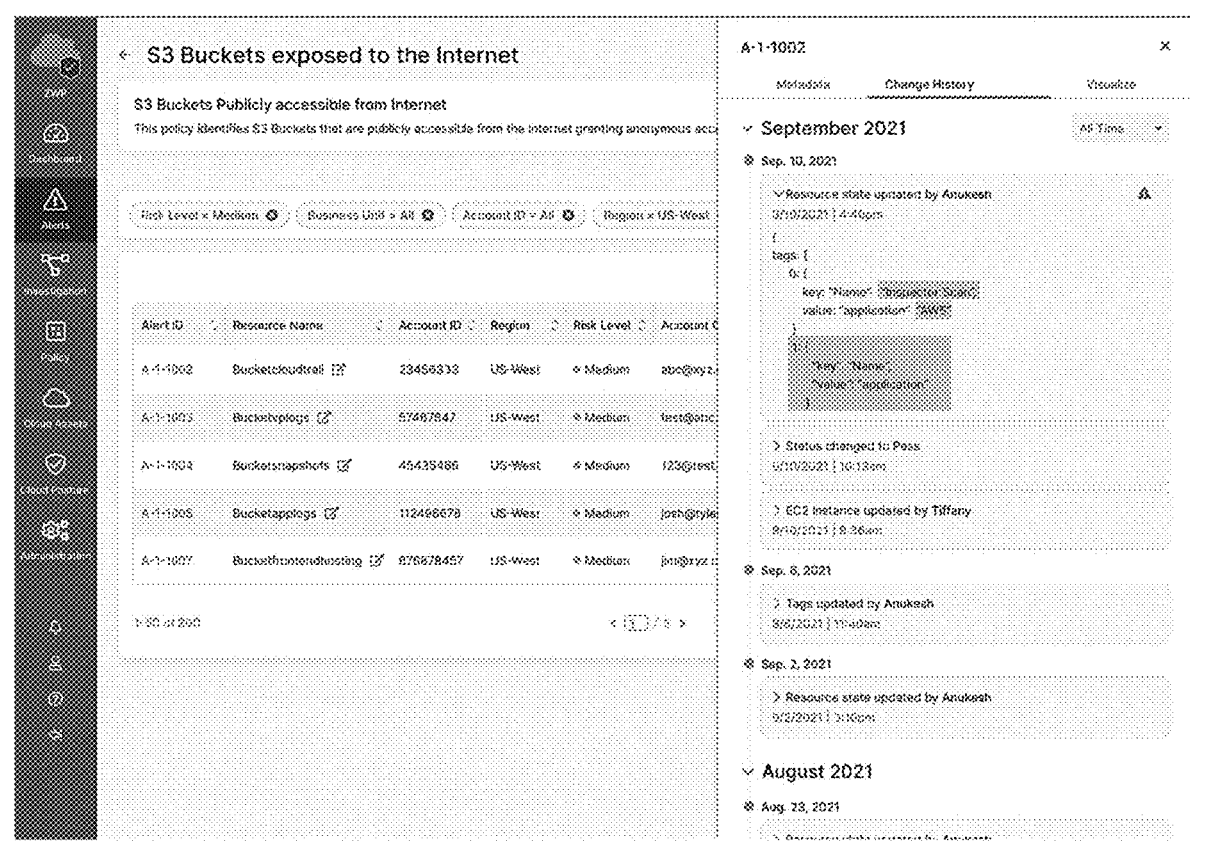

FIG. 17 is a screenshot of a GUI displaying build-time alerting and providing guided remediation. The display provides various alerts associated with one or more scanned plugins with associated risk level. It additionally provides a guide for remediation presenting a recommended remediation procedure. FIG. 18 is a screenshot of a GUI displaying run-time alerting and providing guided remediation. Similarly, the display provides various alerts with associated risk levels.

Figure 19:
FIG. 19 is a screenshot of a GUI displaying threat detection and risk prioritization.

FIG. 18 is a screenshot of a GUI displaying threat detection and risk prioritization. The visualization shown in FIG. 19 shows various security events and security exposures. The security events include a plurality of smart rules identifying various attack scenarios. These can be grouped by common security themes for ease of mapping of risky areas. This allows easy prioritization of urgent items for quick attention and remediation. An investigation path is further provided with complete details for each attack.

The security exposure provides complete security posture coverage and eliminates bombardment of alerts via smart policies for simple and advanced attack vectors. They can further be categorized for ease of access and follow-up.

Posture Control Process

Figure 20:
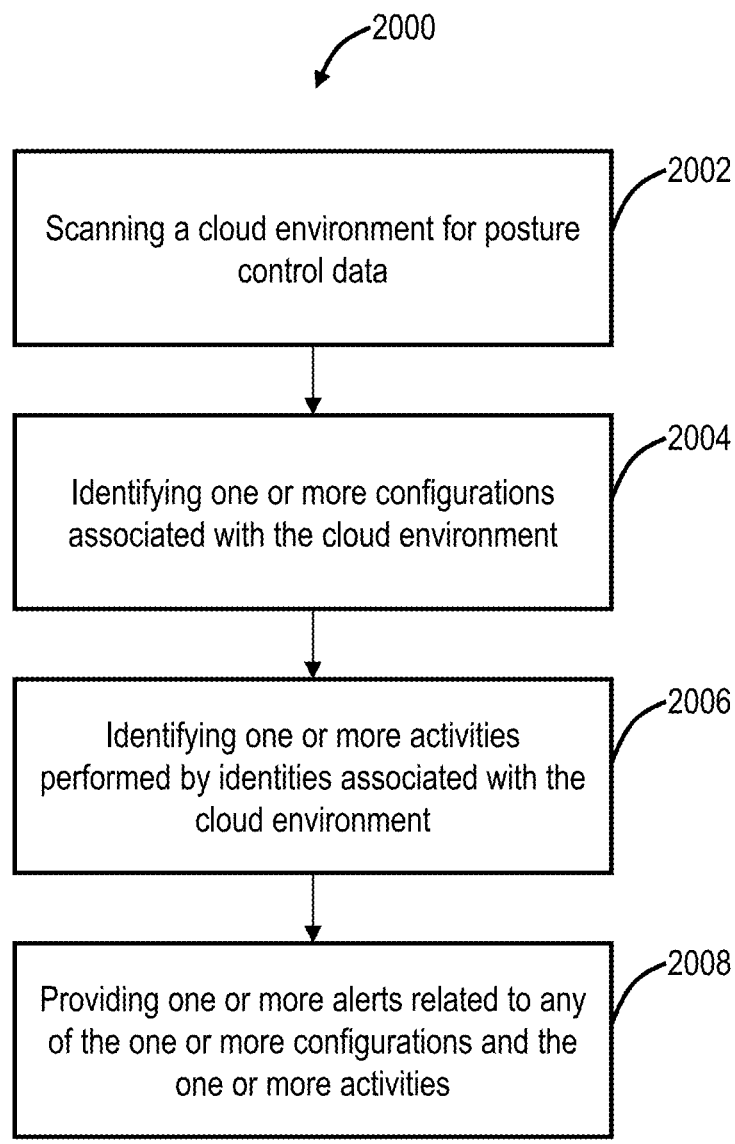
FIG. 20 is a process of posture control for cloud environments.

FIG. 20 is a process 2000 of posture control for cloud environments. The process 2000 includes steps of scanning a cloud environment for posture control data (step 2002); identifying one or more configurations associated with the cloud environment (step 2004); identifying one or more activities performed by a plurality of identities associated with the cloud environment (step 2006); and providing one or more alerts related to any of the one or more configurations and the one or more activities (step 2008).

The process 2000 can further include wherein the one or more alerts include alerting to a combination of a misconfiguration and an activity as a risk. The posture control data can include any of assets, identities, network flow logs, activities, and code repositories in the cloud environment. The cloud environment can be any of a run-time cloud environment and a build-time cloud environment. Prior to the scanning, the steps can further include configuring one or more discovery modules. The posture control data can include any of historical data and real-time data. The steps can further include providing a Graphical User Interface (GUI) displaying the identified configurations and activities. The GUI can include a graphical representation of policy compliance trends in the cloud environment. The GUI can include a timeline of activities associated with any identity of the plurality of identities. The GUI can further include a risk level associated with each activity in the timeline.

Time Series Analysis for Cloud Resources

Current methods for promoting faster innovation and decreased time to market includes giving application developers additional responsibility to deploy and manage their own infrastructure. This helps developers, but detrimentally removes operational teams from the development and deployment process. Such increased and unmonitored deployments are at an increased risk of being vulnerable because of improper configuration, assumptions, and lack of focus on security. Further, decentralized deployments can also cascade to form critical vulnerabilities.

Even further, multiple developers of varying experience work on the same infrastructure projects. For an individual working on the infrastructure, in order to get up to speed on the present condition of the infrastructure environment, a single source of truth is necessary. Various embodiments of the present disclosure provide a timeline to pinpoint problematic, unauthorized, and unwarranted changes. Such a timeline covers the entire lifecycle of a resource from the initial blueprint of the infrastructure (i.e., Infrastructure as Code (IaC)) to deployment of the infrastructure. Various embodiments further cover subsequent changes such as scaling horizontally/vertically, updating properties, etc. until the resource is ultimately decommissioned/terminated.

As described in the present disclosure, the Cloud Native Protection Platform (CNAPP) ingests a variety of CSP data and cloud user activity based data. This data can span over resources, policy and security configurations, identities, IaC, network logs, activity logs, etc. By using this data, systems can be adapted to process and vet if there are any violated industry compliances, predefined or user configured security policies. Because this data is disjoint, there is a necessity to unify IaC and metadata configuration changes to the resource and child resources, cloud user activities, cloud user behavior analytics, and alert violations in a succinct manner. For example, present systems are adapted to associate resource data received from a plurality of subsystems to specific resources in the cloud environment. A resource/account based timeline is provided to fill this gap and provide valuable insights without being a cognitive overload to the user.

Figure 21:
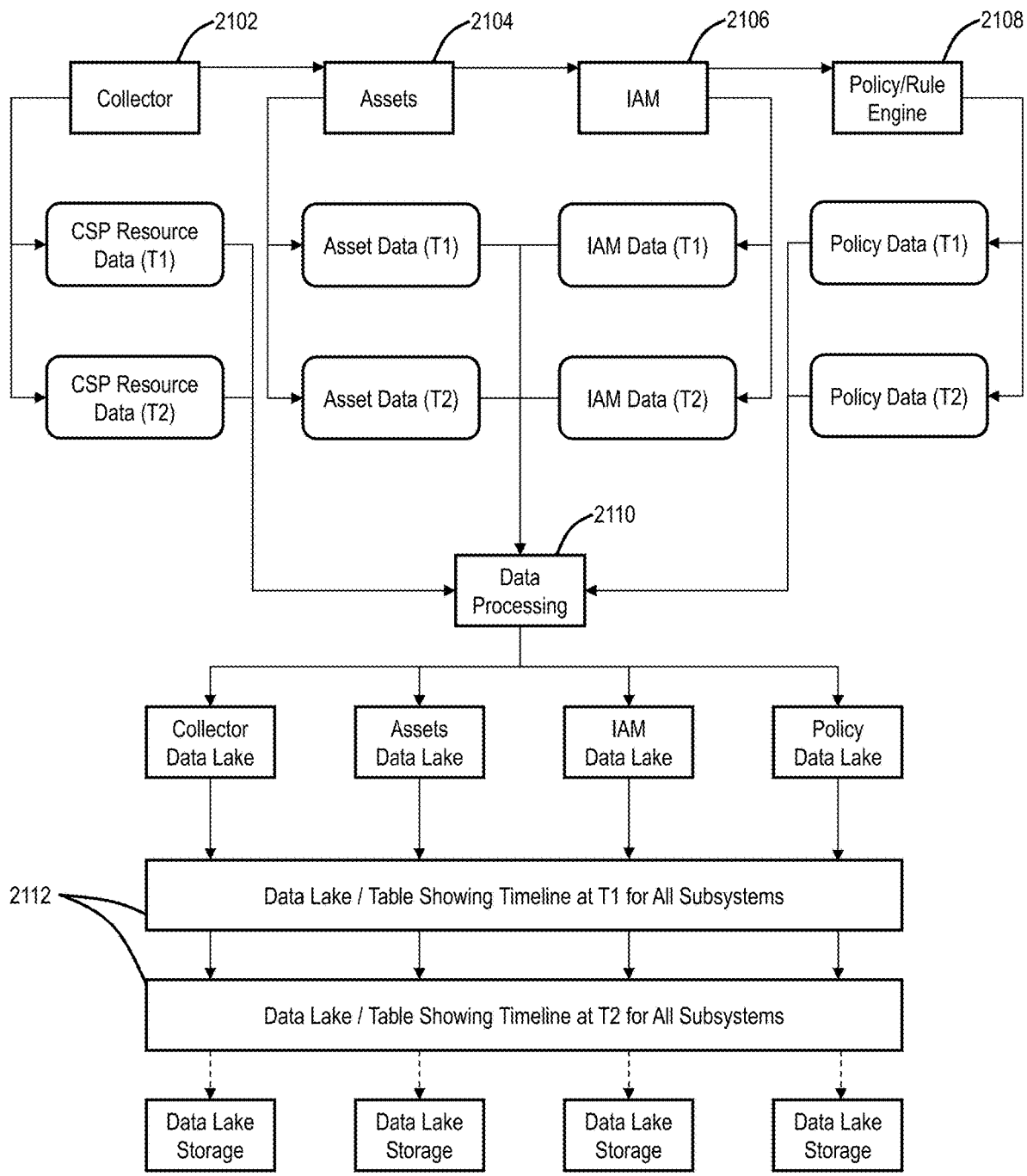
FIG. 21 is a flow diagram of a system for generating a time series analysis for cloud resources.

FIG. 21 is a flow diagram of a system for generating a time series analysis for cloud resources. Again, the CNAPP platform is adapted to ingest various types of data from resources, policy and security configuration, identities, etc. by using dedicated subsystems. The subsystems in place include collector subsystems 2102, asset subsystems 2104, Identity and Access Management (IAM) subsystems 2106, and policy/rule engines 2108. The responsibility of a collector subsystem 2102 includes performing an initial fetch to retrieve a list of resources when a customer is onboarded with their cloud account. By utilizing such a list of resources, the asset subsystem 2104 is adapted to fetch more granular information to describe the resources. It will also retrieve policy and security configurations for the resources. The primary role for IAM subsystems 2106 is to fetch the identities and the permissions associated with an identity. Finally, using the data that is being fed by the rest of the subsystems, the policy/rule engine 2108 is adapted to flag improper configurations according to a point based system. It also raises alerts based on the severity of the vulnerability (i.e., based on the point system). The various types of ingested data described herein can also be referred to as resource data.

As shown in the figure, each subsystem processes its own data one after the other, although this process is asynchronous. In various embodiments, an approach to build a timeline 2112 includes establishing a contract with every subsystem. Each subsystem must push their events (i.e., as a JSON object) to a distributed event streaming platform such as Apache Kafka, specifically a Kafka topic. As is known to one of skill in the art, Apache Kafka is a streaming platform which allows users/systems to publish and subscribe to streams of data, store them, and process them. It will be appreciated that other streaming platforms are contemplated, and the present example of utilizing Apache Kafka, and other Apache products, is non-limiting.

These events/activity logs (i.e., events at times T1 and T2) are then streamed over to the data lake by a framework and distributed processing engine 2110, such as Apache Flink, for stateful computations over data streams. Information pertaining to these events can further be provided in the form of a timeline. FIG. 22 is a diagram of a timeline generated and presented via the present systems and methods. Such timelines can be filtered as to display specific information, such as a timeline of events related to a specific subsystem, specific resource, and the like. To maintain the data integrity of the data lake, a transactional data lake platform is used. In various embodiments, Apache Hudi is used to insert data. Apache Hudi embodies Atomicity, Consistency, Isolation, and Durability (ACID) properties which are helpful for transactional upserts. In various embodiments, Apache Hudi is used in tandem with Apache Flink. A data mesh can be used to query with necessary filters (such as resource and time interval) and retrieve data in chronological order. The fetched data acts as a timeline of activities/events for reference and other actions. In embodiments, various data mesh tools are contemplated and include Trino, Presto, and Starburst.

Further, various embodiments are adapted to receive requests for resource data relating to a specific resource. For example, a user/customer may be interested in viewing a timeline associated with a specific resource (infrastructure). Thus, present systems and methods are adapted to present the specific resource data in a chronological order based on a time associated with each of the plurality of events related to the specific resource. This allows users to view timelines relating to specific infrastructure/resources for determining any problematic, unauthorized, and unwarranted changes and activities.

By utilizing a stream processing engine, the data can be updated in real time and can have minimal latency. Every subsystem (i.e., the collector subsystems, asset subsystems, IAM subsystems, and policy/rule engines) must push data into the data processing system (i.e., Kafka) with the same schema so that the framework is able to treat all the subsystems generically. Events being stored in the data lake can follow the following structure and include the following information.

Customer Id: is used to identify an individual customer on the platform.
Account Id: is the unique identifier to associate a cloud account for the customer.
Resource Id: is the identifier for a resource in the cloud account.
Subsystem Identifier: is used to specify the subsystem that pushed the event.
CSP event timestamp (CSP_TS): is the timestamp at which the CSP processed the event.
Subsystem Received Timestamp (SSR_TS): is the timestamp at which the subsystem started processing the event.
Subsystem Processed Timestamp (SSP_TS): is the timestamp at which the event was processed by the subsystem.
Subsystem Processed Data as a JSON object: is the data that contains more granular information of the processing done by the subsystem.

The present systems are further adapted to present such events in a readable format as shown in FIG. 22. For example, in a timeline of events, information such as the time and description of the event are provided to allow a user to identify any important matter easily and quickly. It will be appreciated that a timeline can include any other information regarded as being important for a user/customer to identify, and the example depicted in FIG. 22 is non-limiting.

Various embodiments utilize systems for writing data into the data lake. In an embodiment, Apache Hudi is used for this process. Such systems use Multi-Version Concurrency Control (MVCC). This creates a copy of the data and then overwrites the change to the new copy of the data file. This causes I/O cost to be amplified as the data partition file is being rewritten. To lower the I/O cost, the Apache Hudi framework has a Merge-On-Read configuration. This essentially causes the changes to be logged onto a log file. As these changes are sequential and have a minimal overhead, it is faster to consume data in one run. Therefore, at periodic intervals, the logs files are read and executed to create a compact and larger file to reduce the I/O amplification. Moreover, this means that small files are not being created which also helps to increase read throughput. By utilizing frameworks such as Apache Hudi, corruption of data can be mitigated and will only happen with rare occurrence. Such frameworks also support upserts to prevent duplication of data.

Process for Time Series Analysis of Cloud Resources

Figure 23:
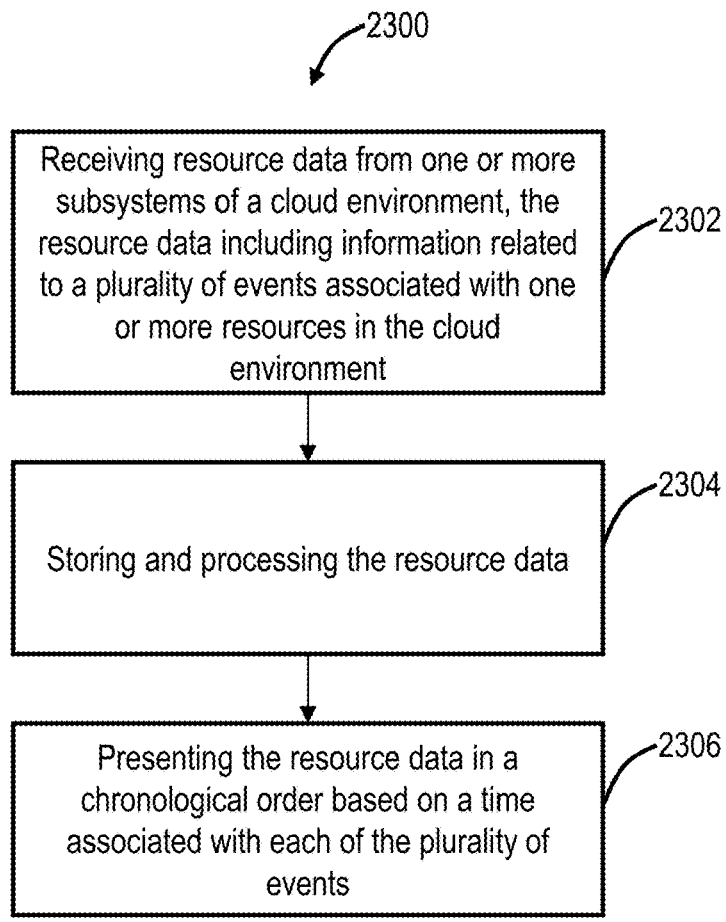
FIG. 23 is a flow chart of a process for time series analysis of cloud resources.

FIG. 23 is a flow diagram of a process 2300 for time series analysis of cloud resources. The process 2300 includes steps of receiving resource data from one or more subsystems of a cloud environment, the resource data including information related to a plurality of events associated with one or more resources in the cloud environment (step 2302); storing and processing the resource data (step 2304); and presenting the resource data in a chronological order based on a time associated with each of the plurality of events (step 2306).

The process 2300 can further include wherein the one or more subsystems can include any of collector, asset, Identity and Access Management (IAM), and policy/rule subsystems. The resource data can include any of assets, identities, network flow logs, activities, and code repositories in the cloud environment. The steps can further include receiving a request for resource data of a specific resource; and presenting the specific resource data in a chronological order based on a time associated with each of the plurality of events related to the specific resource. The steps can further include associating the resource data to specific resources in the cloud environment. Prior to the receiving, the steps can include establishing a contract with each of the one or more subsystems. The resource data can include any of historical data and real-time data. The presenting can further include providing a Graphical User Interface (GUI) displaying the resource data in a chronological order. The storing and processing can include utilizing a data mesh to query resource data for presenting specific resource data in chronological order. The resource data can be queried with one or more filters including specific resource and time interval.

Anomaly Detection on Activity Logs

The present disclosure provides various embodiments of systems and methods for anomaly detection. That is, the various embodiments are adapted to be applied over activity log data in order to find anomalous sessions/activities among the data such as the time series based activity logs described herein. Further, various embodiments can utilize such data to demonstrate similarities between resources in the cloud-based system. The present systems and methods aim to make anomaly detection more effective by providing a predicate of how anomalous a given sequence of activity is on a per-resource basis. That is, the various embodiments described herein can determine a probability for a given sequence to occur for either a specific resource, or resources with similar activity patterns, referred to herein as activity peers. Such calculations can be performed based on historical resource activity data (activities) over a predefined time span.

For performing anomaly detection, various novel techniques are presented. Such techniques include representing resources of the cloud-based system as vectors and applying them over the activity log data for finding anomalous sessions among the data. By performing aggregation and various calculations on the resource activity data, the systems can produce vectors of activities, representing the activities of each resource. Then, based on statistical probability, an anomaly score can be calculated. In various embodiments, such an anomaly score can be utilized in conjunction with various thresholds to determine if a resource is acting in a suspicious manner, i.e., if the anomaly score is above an anomaly threshold. Further, by utilizing various similarity measurements among resources' vector representations, the systems can understand if some resources have similar activity behavior. By doing so, false positives can be reduced, while also taking such considerations into account when determining anomaly scores.

Figure 24:
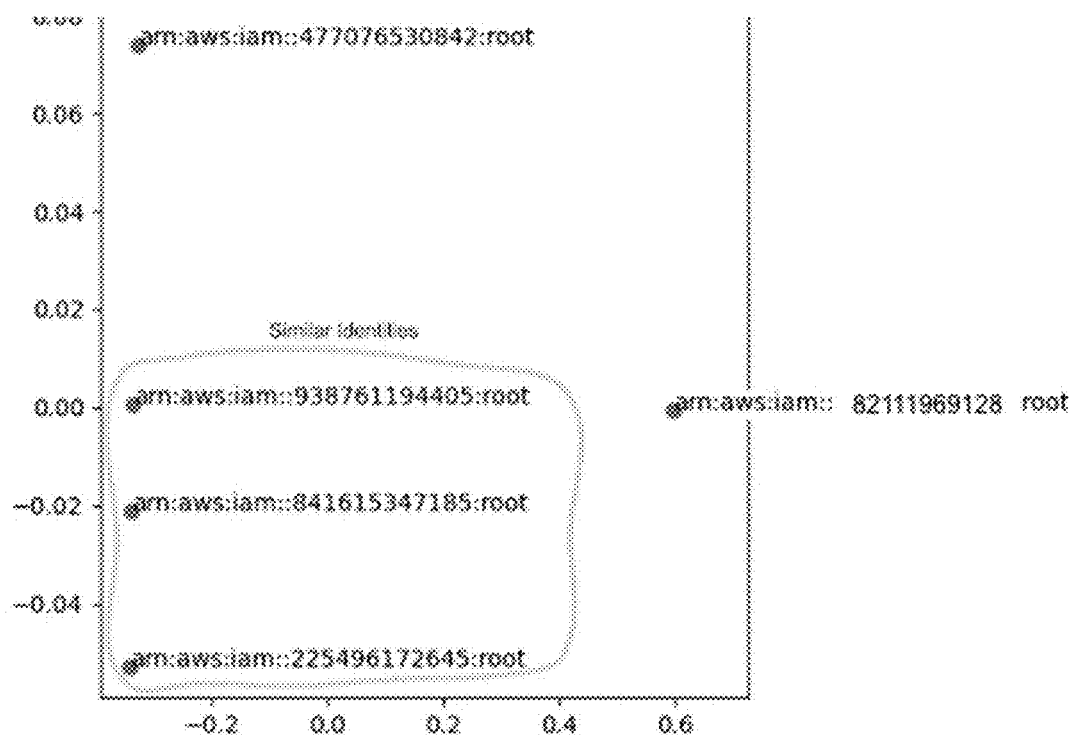
FIG. 24 is a graphical representation of resource similarity in a cloud-based system.

In addition to the functions of the present systems and methods described herein for determining anomalous behaviors, various additional uses are contemplated. These uses can include utilizing the present systems and methods to determine a number N of activity peers, N being an integer. This can be utilized for identifying resources that share similar activity patterns due to worm malware, when such resources should not have similar activity patterns. Further, the systems can be utilized to display the similarity between resources via one or more graphical representations, such as the resource similarity graph shown in FIG. 24.

In various embodiments, resource activity logs (resource activity data) are contemplated as logs which describe activities executed by some identity/resource in the cloud-based system. AWS cloudtrail logs are an example of activity logs. The various embodiments herein are described as utilizing AWS cloudtrail logs, but it will be appreciated that any activity log known to one of skill in the art can be utilized to perform the steps described herein. An example of an activity log is shown below.

eventVersion: 1.08
    userIdentity: {6}
    eventTime: 2022-10-20T14:08:00Z
    eventSource: cloudtrail.amazonaws.com
    eventName: LookupEvents
    awsRegion: us-east-2
    sourceIPAddress: 3.137.53.125
    userAgent: aws-sdk-go-v2/1.16.11 os/linux lang/go/1.17.13 md/GOOS/linux md/GOARCH/amd64 api/cloudtrail/1.10.1
    requestParameters: {3}
    responseElements: null
    requestID: 9446b843-9cbc-4cf1-96ab-525c35a334e1
    eventID: 4a4f4240-77fe-4e8b-864d-832b666a922d
    readOnly: true
    eventType: AwsApiCall
    managementEvent: true
    recipientAccountId: 000319668258
    eventCategory: Management
    tlsDetails: {3}

It will be appreciated that the example log shown above is shortened due to full activity logs being long. In the example, it can be seen that the event type is an AWS API Call executed by the Source IP Address 3.137.53.125, wherein the specific event was a lookup event. Such activity logs are some of the most common data types which are served to security systems such as the various cloud security systems described herein. The need to monitor activity logs exists because of their ability to demonstrate malicious or abnormal behavior/activities of resources. Thus, the present disclosure provides systems and methods for anomaly detection utilizing time-series analysis and similarity measurements among resources' vectorial representations. In various embodiments, methods include data preparation and aggregation, similarity measurements, and production of anomaly scores.

In an embodiment, the present steps refer to a training set period and a test set period. Both the training set period and the test set period are predefined and can be any length of time depending on the configuration. In the present example, the training set period is configured to 1 month, while the test set period is configured to 1 day. As time advances, the training set period and test set period move along as a moving window allowing the systems to utilize the most recent "historical data". For example, based on the configurations of the training set period being 1 month, and the test set period being 1 day, the systems will always be using data from the previous 30 days (1 month) as the training set, and the previous day (1 day) as the test set. The test set can also be contemplated as a prediction set, wherein the test set is utilized to predict which of the logs are anomalous based on the training set. That is, the systems are trained with the training set, in this case logs from the previous 30 days. Then, the logs from the next day (after the 30 days) is used as the test set to predict anomalous sessions. Again, as time progresses, the training set and test set move along to feed the systems with most recent data, i.e., activity logs. That is, collecting resource activity data is performed over a pre-configured time span based on the training set period.

From the activity logs collected over the training set period and the test set period, the systems are adapted to extract relevant data. In an embodiment, this relevant data includes event time, source IP address, and event name. The following table shows this data sorted based on event time. In addition, the systems label each event with an ID in ascending order based on the event time. The present example includes logs from only 3 sources for simplicity, but it will be appreciated that when utilized on real production data, this number will be far greater.

| ID | eventTime | sourceIPAddress | eventName |
|---|---|---|---|
| 1 | Oct. 1, 2023 14:10:15 | 10.10.10.1 | ListDB |
| 2 | Oct. 1, 2023 14:10:25 | 10.10.10.2 | CopyDBTable |
| 3 | Oct. 1, 2023 14:10:40 | 10.10.10.1 | DeleteTable |
| 4 | Oct. 1, 2023 14:13:11 | 10.10.10.3 | ListDB |
| 5 | Oct. 1, 2023 14:43:15 | 10.10.10.2 | CopyDBTable |
| 6 | Oct. 1, 2023 15:10:11 | 10.10.10.3 | DeleteTable |
| 7 | Oct. 1, 2023 15:10:33 | 10.10.10.2 | ListDB |
| 8 | Oct. 1, 2023 16:10:03 | 10.10.10.1 | CopyDBTable |
| 9 | Oct. 1, 2023 17:10:15 | 10.10.10.3 | DeleteTable |
| 10 | Oct. 1, 2023 17:29:15 | 10.10.10.3 | ListDB |
| 11 | Oct. 1, 2023 17:44:46 | 10.10.10.2 | CopyDBTable |
| 12 | Oct. 2, 2023 14:10:13 | 10.10.10.1 | CopyDBTable |
| 13 | Oct. 2, 2023 14:19:15 | 10.10.10.1 | ListDB |
| 14 | Oct. 2, 2023 14:37:29 | 10.10.10.2 | LookupEvents |
| 15 | Oct. 3, 2023 11:14:54 | 10.10.10.1 | LookupEvents |
| 16 | Oct. 3, 2023 08:10:10 | 10.10.10.1 | ListDB |
| 17 | Oct. 3, 2023 09:00:04 | 10.10.10.2 | ListDB |

The systems are then adapted to aggregate the data per source. That is, the data is aggregated based on source and event. For example, in the data shown in the table above, source 10.10.10.1 performed the event of ListDB a total of 3 times. The table below shows this aggregated data.

| ID | sourceIPAddress | eventName | eventCount |
|---|---|---|---|
| 1 | 10.10.10.1 | ListDB | 3 |
| 2 | 10.10.10.2 | CopyDBTable | 3 |
| 3 | 10.10.10.1 | DeleteTable | 1 |
| 4 | 10.10.10.3 | ListDB | 2 |
| 5 | 10.10.10.2 | ListDB | 2 |
| 6 | 10.10.10.1 | CopyDBTable | 2 |
| 7 | 10.10.10.3 | DeleteTable | 2 |
| 10 | 10.10.10.2 | LookupEvents | 1 |
| 11 | 10.10.10.1 | LookupEvents | 1 |

For the present example, the aggregated table above represents aggregated data from the test set period, i.e., the 1 day after the training set period.

Figure 25:
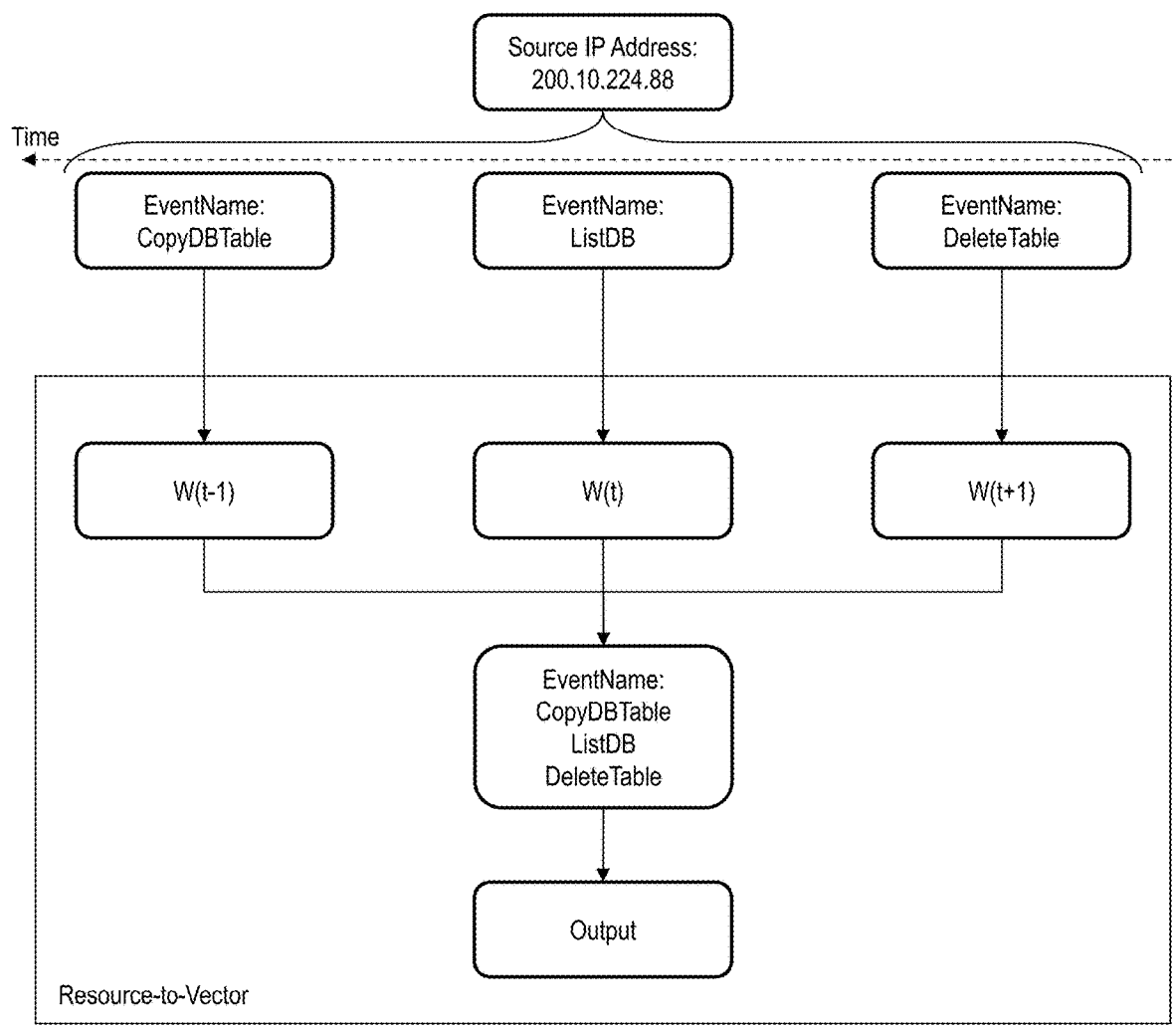
FIG. 25 is a flow diagram of the process for grouping resource activities into triples.

For extracting data from the training set period, various embodiments include the following steps which are performed over the entire training set period (30 days). For each source IP address, the systems group events/activities in groups of 3. That is, the systems take 3 successive activities and combine them into a triple. The time period between these 3 activities does not matter, as long as the 3 activities were performed successively by the resource. FIG. 25 is a flow diagram of the process for grouping resource activities into triples. The triples, i.e., each group of 3 consecutive activities can also be referred to as a resource session.

In order to determine and create these triples for each resource, the following steps are performed. The systems separate the logs sorted for each resource as shown in the table below. The logs for each resource are sorted in ascending order based on the event time (eventTime).

| sourceIPAddress | ID | eventTime | eventName |
|---|---|---|---|
| 10.10.10.3 | 4 | Oct. 1, 2023 14:13:11 | ListDB |
| | 6 | Oct. 1, 2023 15:10:11 | DeleteTable |
| | 9 | Oct. 1, 2023 17:10:15 | DeleteTable |
| | 10 | Oct. 1, 2023 17:29:15 | ListDB |
| 10.10.10.2 | 2 | Oct. 1, 2023 14:10:25 | CopyDBTable |
| | 5 | Oct. 1, 2023 14:43:15 | CopyDBTable |
| | 7 | Oct. 1, 2023 15:10:33 | ListDB |
| | 11 | Oct. 1, 2023 17:44:46 | CopyDBTable |
| | 14 | Oct. 2, 2023 14:37:29 | LookupEvents |
| | 17 | Oct. 3, 2023 09:00:04 | ListDB |
| 10.10.10.1 | 1 | Oct. 1, 2023 14:10:15 | ListDB |
| | 3 | Oct. 1, 2023 14:10:40 | DeleteTable |
| | 8 | Oct. 1, 2023 16:10:03 | CopyDBTable |
| | 12 | Oct. 2, 2023 14:10:13 | CopyDBTable |
| | 13 | Oct. 2, 2023 14:19:15 | ListDB |
| | 15 | Oct. 3, 2023 11:14:54 | LookupEvents |
| | 16 | Oct. 3, 2023 08:10:10 | ListDB |

The systems are then adapted to group the logs in triple sequences for each resource. This is shown in the table below.

| sourceIPAddress | eventTime | eventName |
|---|---|---|
| 10.10.10.3 | Oct. 1, 2023 14:13:11 | ListDB |
| | Oct. 1, 2023 15:10:11 | DeleteTable |
| | Oct. 1, 2023 17:10:15 | DeleteTable |
| | Oct. 1, 2023 15:10:11 | DeleteTable |
| | Oct. 1, 2023 17:10:15 | DeleteTable |
| | Oct. 1, 2023 17:29:15 | ListDB |
| 10.10.10.2 | Oct. 1, 2023 14:10:25 | CopyDBTable |
| | Oct. 1, 2023 14:43:15 | CopyDBTable |
| | Oct. 1, 2023 15:10:33 | ListDB |
| | Oct. 1, 2023 14:43:15 | CopyDBTable |
| | Oct. 1, 2023 15:10:33 | ListDB |
| | Oct. 1, 2023 17:44:46 | CopyDBTable |
| | Oct. 1, 2023 15:10:33 | ListDB |
| | Oct. 1, 2023 17:44:46 | CopyDBTable |
| | Oct. 2, 2023 14:37:29 | LookupEvents |
| | Oct. 1, 2023 17:44:46 | CopyDBTable |
| | Oct. 2, 2023 14:37:29 | LookupEvents |
| | Oct. 3, 2023 09:00:04 | ListDB |
| 10.10.10.1 | Oct. 1, 2023 14:10:15 | ListDB |
| | Oct. 1, 2023 14:10:40 | DeleteTable |
| | Oct. 1, 2023 16:10:03 | CopyDBTable |
| | Oct. 1, 2023 14:10:40 | DeleteTable |
| | Oct. 1, 2023 16:10:03 | CopyDBTable |
| | Oct. 2, 2023 14:10:13 | CopyDBTable |
| | Oct. 1, 2023 16:10:03 | CopyDBTable |
| | Oct. 2, 2023 14:10:13 | CopyDBTable |
| | Oct. 2, 2023 14:19:15 | ListDB |
| | Oct. 2, 2023 14:10:13 | CopyDBTable |
| | Oct. 2, 2023 14:19:15 | ListDB |
| | Oct. 3, 2023 11:14:54 | LookupEvents |
| | Oct. 2, 2023 14:19:15 | ListDB |
| | Oct. 3, 2023 11:14:54 | LookupEvents |
| | Oct. 3, 2023 08:10:10 | ListDB |

Further, the count for each of the triples (triple_count) is determined. In the present example, the tables only show one example of each of the triples, but it is assumed that if the data was collected for the training set period of 1 month, there would be a much larger data set. Assuming the larger data set collected over the training set period, the counts for each of the triples could look as follows.

| sourceIPAddress | eventTime | eventName | triple_count |
|---|---|---|---|
| 10.10.10.3 | Oct. 1, 2023 14:13:11 | ListDB | 35 |
| | Oct. 1, 2023 15:10:11 | DeleteTable | |
| | Oct. 1, 2023 17:10:15 | DeleteTable | |
| | Oct. 1, 2023 15:10:11 | DeleteTable | 12 |
| | Oct. 1, 2023 17:10:15 | DeleteTable | |
| | Oct. 1, 2023 17:29:15 | ListDB | |
| 10.10.10.2 | Oct. 1, 2023 14:10:25 | CopyDBTable | 11 |
| | Oct. 1, 2023 14:43:15 | CopyDBTable | |
| | Oct. 1, 2023 15:10:33 | ListDB | |
| | Oct. 1, 2023 14:43:15 | CopyDBTable | 88 |
| | Oct. 1, 2023 15:10:33 | ListDB | |
| | Oct. 1, 2023 17:44:46 | CopyDBTable | |
| | Oct. 1, 2023 15:10:33 | ListDB | 21 |
| | Oct. 1, 2023 17:44:46 | CopyDBTable | |
| | Oct. 2, 2023 14:37:29 | LookupEvents | |
| | Oct. 1, 2023 17:44:46 | CopyDBTable | 3 |
| | Oct. 2, 2023 14:37:29 | LookupEvents | |
| | Oct. 3, 2023 09:00:04 | ListDB | |

| sourceIPAddress | eventTime | eventName | triple_count |
|---|---|---|---|
| 10.10.10.1 | Oct. 1, 2023 14:10:15 | ListDB | 1 |
| | Oct. 1, 2023 14:10:40 | DeleteTable | |
| | Oct. 1, 2023 16:10:03 | CopyDBTable | |
| | Oct. 1, 2023 14:10:40 | DeleteTable | 25 |
| | Oct. 1, 2023 16:10:03 | CopyDBTable | |
| | Oct. 2, 2023 14:10:13 | CopyDBTable | |
| | Oct. 1, 2023 16:10:03 | CopyDBTable | 16 |
| | Oct. 2, 2023 14:10:13 | CopyDBTable | |
| | Oct. 2, 2023 14:19:15 | ListDB | |
| | Oct. 2, 2023 14:10:13 | CopyDBTable | 124 |
| | Oct. 2, 2023 14:19:15 | ListDB | |
| | Oct. 3, 2023 11:14:54 | LookupEvents | |
| | Oct. 2, 2023 14:19:15 | ListDB | 6 |
| | Oct. 3, 2023 11:14:54 | LookupEvents | |
| | Oct. 3, 2023 08:10:10 | ListDB | |

Once the triple counts are determined for the training set period, the systems are adapted to produce a matrix for the appearances of each triple for each of the resources. For ease of understanding, the following table includes additional resources (Source IP Addresses) and larger triple counts, but it will be appreciated that the data shown can be produced by the steps described herein with larger data sets, i.e., data collected for more resources over a large period of time (the training set period). Further, real production data will include a much larger number of distinct triples, but the present example is limited for ease of presentation.

| Source IPAddress | ListDB ListDB DeleteTable | DeleteTable DeleteTable ListDB | CopyDBTable CopyDBTable ListDB | CopyDBTable ListDB CopyDBTable | ListDB CopyDBTable LookupEvents | ... |
|---|---|---|---|---|---|---|
| 10.10.10.5 | 64 | 25 | 11 | 7 | 7 | ... |
| 10.10.10.4 | 71 | 19 | 13 | 8 | 9 | ... |
| 10.10.10.3 | 35 | 122 | 0 | 3 | 0 | ... |
| 10.10.10.2 | 0 | 0 | 11 | 1 | 21 | ... |
| 10.10.10.1 | 0 | 0 | 13 | 70 | 29 | ... |

Once the data preparation and aggregation stage is completed, the similarity measurements stage can be initiated. From the data collected and processed during the training set period, the following vectors can be extracted from the table shown above.

10.10.10.5=[64, 25, 11, 7, 7, . . . ]
10.10.10.4=[71, 19, 13, 8, 9, . . . ]
10.10.10.3=[35, 122, 0, 3, 0, . . . ]
10.10.10.2=[0, 0, 11, 1, 21, . . . ]
10.10.10.1=[0, 0, 13, 70, 29, . . . ]

Once the vectorial representation of each resource is produced, the systems then scale the data to achieve a statistical based matrix which provides the statistical probability of each logs sequence to be executed by some resource, which is referred to as a probability matrix. The vectors are scaled by dividing each vector by its total sum of actions, thus each vector will be equal to 1—the sum its action probabilities. The following equation describes how each vector is scaled, where V is a vectorial representation of each resource, and $x_i$ is a unit within a vector.

$$\exists v_i \in V, x_i \in v_i | x_i \div \sum_1^n x_i$$

The following probability vectors are then produced. Again, the following vectors are shortened for ease of presentation.

10.10.10.5=[0.503937, 0.196850, 0.086614, 0.055118, 0.055118, . . . ]
10.10.10.4=[0.500000, 0.133803, 0.091549, 0.056338, 0.063380, . . . ]
10.10.10.3=[0.189189, 0.659459, 0.000000, 0.016216, 0.000000, . . . ]
10.10.10.2=[0.000000, 0.000000, 0.048673, 0.004425, 0.092920, . . . ]
10.10.10.1=[0.000000, 0.000000, 0.042763, 0.230263, 0.095395, . . . ]

Based on these probability vectors, the following probability matrix can be produced.

Resource Similarity

For performing the similarity matrix extraction process, the following steps are performed. A new matrix is produced with the representation of each vector compared to each of the other vectors while measuring the similarity among the vectors using a similarity method. Any similarity method can be utilized to measure the distance between vectors such as cosine similarity, Euclidian distance, correlation, or other methods known to one of skill in the art. The present examples make use of, and demonstrate the cosine similarity and the correlation methods.

For the correlation method, the systems transpose the probability matrix, measure the correlation, and then absolute all of the values. The similarity matrix produced by this method is shown below.

|  | 10.10.10.5 | 10.10.10.4 | 10.10.10.3 | 10.10.10.2 | 10.10.10.1 |
| --- | --- | --- | --- | --- | --- |
| 10.10.10.5 | 1.0 | 0.979405 | 0.472126 | 0.302738 | 0.346426 |
| 10.10.10.4 | 0.979405 | 1.0 | 0.340158 | 0.146771 | 0.197237 |
| 10.10.10.3 | 0.472126 | 0.340158 | 1.0 | 0.261134 | 0.339687 |
| 10.10.10.2 | 0.302738 | 0.146771 | 0.261134 | 1.0 | 0.849438 |
| 10.10.10.1 | 0.346426 | 0.197237 | 0.339687 | 0.849438 | 1.0 |

This matrix represents the similarity scores between each pair of vectors.

When utilizing the cosine similarity method, the cosine similarity is measured among the vector in the same way using 1-spatial.distance.cosine (Vector1, Vector2) for each pair.

Figure 26:
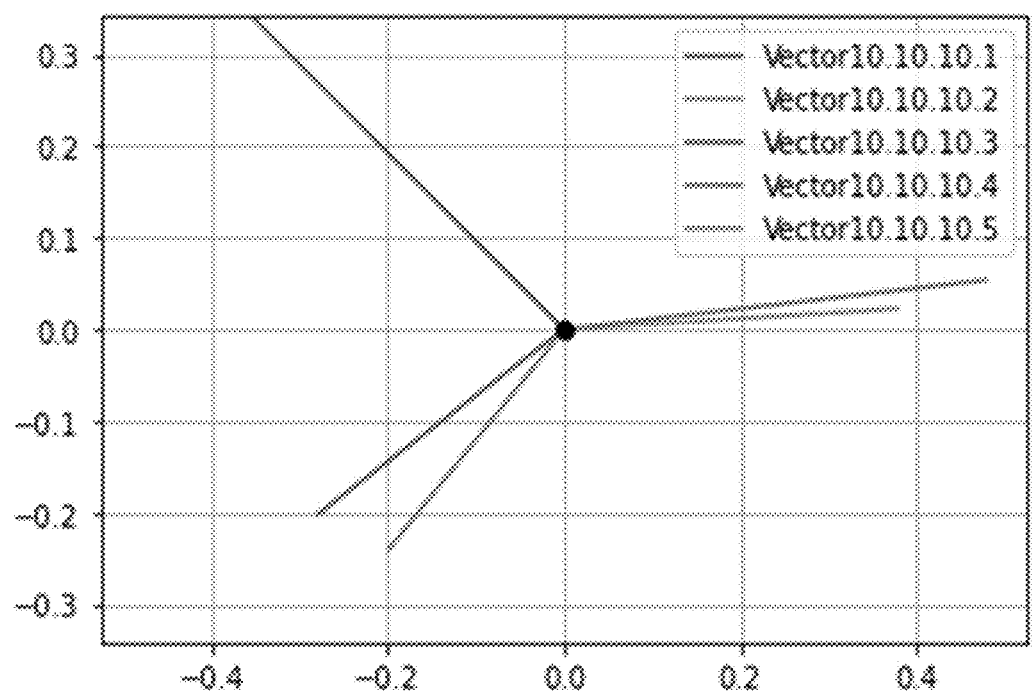
FIG. 26 is a graphical representation of resource similarity.

For visualizing the similarity matrix, the following steps are performed. First, in order to be able to plot the vectors, the systems reduce them into a 2-dimensional representation, which can be done by any kind of dimensionality reduction technique model or technique known to one of skill in the art. Then, the systems can plot the vectors in one or more graphical representations. In an example, each point of the dimensions is plotted as a y representation with x representation of 0, thus the plot shown in FIG. 26 is produced. Such a graphical representation can be provided by the various GUIs described herein.

|  | ListDB DeleteTable DeleteTable | DeleteTable DeleteTable ListDB | CopyDBTable CopyDBTable ListDB | CopyDBTable ListDB CopyDBTable | ListDB CopyDBTable LookupEvents | |
| --- | --- | --- | --- | --- | --- | --- |
| 10.10.10.5 | 0.504 | 0.197 | 0.087 | 0.055 | 0.055 | . . . |
| 10.10.10.4 | 0.5 | 0.134 | 0.092 | 0.056 | 0.063 | . . . |
| 10.10.10.3 | 0.189 | 0.659 | 0.0 | 0.016 | 0.0 | . . . |
| 10.10.10.2 | 0.0 | 0.0 | 0.049 | 0.004 | 0.093 | . . . |
| 10.10.10.1 | 0.0 | 0.0 | 0.043 | 0.23 | 0.095 | . . . |

This probability matrix provides the probability for each activity log sequence to be executed by the resource during the test set period, for example if the 10.10.10.5 resource, would execute the sequence: "ListDB, DeleteTable, DeleteTable" the probability for this sequence to execute would be 0.504. For another example, if the same resource will execute the sequence: "ListDB, CopyDBTable, LookupEvents", the probability for this sequence would be 0.055.

It is noted that in case of a new sequence that has not appeared in the network during the training set period, it will not be assigned any probability, and the systems will leave it to be part of the training set for the next window of training and test aggregation, because it might be a legitimate new sequence caused by some new service added in the network.

Anomaly Score Production

After the systems produce the vectorial representation of each resource, the probability of each vector and the similarity between other vectors can be measured. These measurements are all taken into account and utilized to produce some anomaly score. First, the diagonal unit in the similarity matrix is zeroed. Then, for each resource's sequence from the test set period, if it exists in the training set period (if it doesn't it will not get an anomaly score as mentioned above), its anomaly score is calculated by taking the maximum value between its probability according to the probability matrix (i.e. the probability for this log sequence to be executed by that resource), and the probability of it's most similar asset (according to the similarity matrix) to execute this log sequence.

For example, take the following probability matrix:

|  | ListDB DeleteTable DeleteTable | DeleteTable DeleteTable ListDB | CopyDBTable CopyDBTable ListDB | CopyDBTable ListDB CopyDBTable | ListDB CopyDBTable LookupEvents | ... |
| --- | --- | --- | --- | --- | --- | --- |
| 10.10.10.5 | 0.504 | 0.197 | 0.087 | 0.055 | 0.055 | ... |
| 10.10.10.4 | 0.5 | 0.134 | 0.092 | 0.056 | 0.063 | ... |
| 10.10.10.3 | 0.189 | 0.659 | 0.0 | 0.016 | 0.0 | ... |
| 10.10.10.2 | 0.0 | 0.0 | 0.049 | 0.004 | 0.093 | ... |
| 10.10.10.1 | 0.0 | 0.0 | 0.043 | 0.23 | 0.095 | ... |

And the following similarity matrix:

|  | 10.10.10.5 | 10.10.10.4 | 10.10.10.3 | 10.10.10.2 | 10.10.10.1 |
| --- | --- | --- | --- | --- | --- |
| 10.10.10.5 | 1.0 | 0.979405 | 0.472126 | 0.302738 | 0.346426 |
| 10.10.10.4 | 0.979405 | 1.0 | 0.340158 | 0.146771 | 0.197237 |
| 10.10.10.3 | 0.472126 | 0.340158 | 1.0 | 0.261134 | 0.339687 |
| 10.10.10.2 | 0.302738 | 0.146771 | 0.261134 | 1.0 | 0.849438 |
| 10.10.10.1 | 0.346426 | 0.197237 | 0.339687 | 0.849438 | 1.0 |

If it is desired to calculate the anomaly score of the sequence: "CopyDBTable, ListDB, CopyDBTable" for the asset: 10.10.10.2, the systems will (1) check which of the resources is most similar to it according to the similarity matrix. In this example, 10.10.10.2 is the most similar to 10.10.10.1 with a similarity score of 0.849 according to the similarity table, and (2) take the maximum probability from the probability matrix for both similar resources 10.10.10.1 and 10.10.10.2. It can be seen that resource 10.10.10.2 has a probability of 0.004 to perform this log sequence, but its similar resource 10.10.10.1 has a probability of 0.23 to perform it. Thus, the final anomaly score for this action is 0.23, which is the larger probability between the similar resources. This process can be represented in mathematical form by the following equation, where A is the resource and V is the vector representation of the resource.

$$\exists v_i \in V_j, V_j \in A | max(\text{probability score}(v_i), \text{similarity score}(v_i))$$

By implementing the present systems and methods, the cloud-based system 100 can be adapted to perform inline monitoring of a cloud environment, wherein the inline monitoring includes collecting real-time resource activity data. The historical data and real-time resource activity data can be utilized to alert administrators if a resource is executing a suspicious sequence of events. Determining an anomaly score for a sequence of events executed by a resource can be determined as described above, and sending an alert can be based on the anomaly score being below a threshold.

The present systems and methods aim to make anomaly detection more effective by providing a prediction of how anomalous a given sequence of activity is on a per-resource basis. Generally, the systems calculate the probability for a given sequence to occur for either the resource or a resource with similar activity patterns (activity peers). The calculations are made based on historical activities, over a preconfigured time span.

Process for Resource Anomaly Detection

Figure 27:
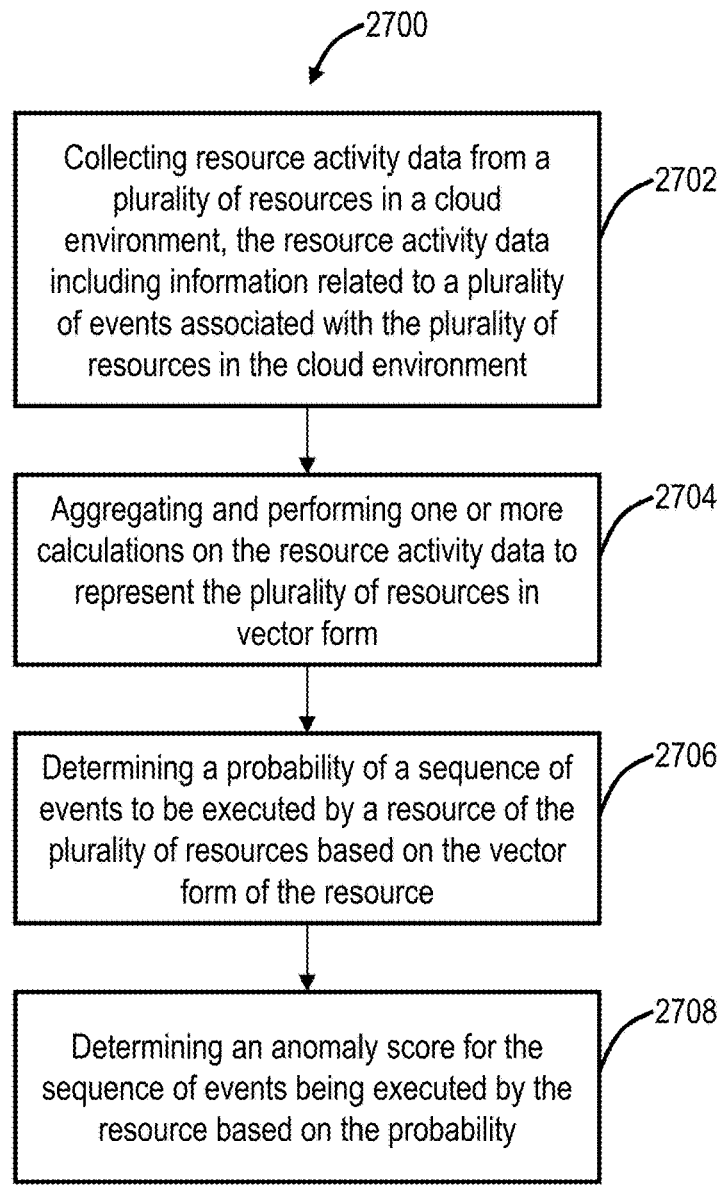
FIG. 27 is a flow chart of a process for resource anomaly detection.

FIG. 27 is a flow chart of a process 2700 for resource anomaly detection. The process 2700 includes collecting resource activity data from a plurality of resources in a cloud environment, the resource activity data including information related to a plurality of events associated with the plurality of resources in the cloud environment (step 2702); aggregating and performing one or more calculations on the resource activity data to represent the plurality of resources in vector form (step 2704); determining a probability of a sequence of events to be executed by a resource of the plurality of resources based on the vector form of the resource (step 2706); and determining an anomaly score for the sequence of events being executed by the resource based on the probability (step 2708).

The process 2700 can further include wherein the collecting resource activity data is performed for a preconfigured historical time span. The aggregating can include grouping the plurality of events into a plurality of triples, wherein each of the plurality of triples includes 3 events executed by a resource of the plurality of resources in sequence. The one or more calculations can include calculating a number of occurrences that each of the plurality of resources executed each of the plurality of triples. The sequence of events can be a triple, wherein determining the probability of the triple to be executed by the resource is based on the number of occurrences that the resource executed the triple. The probability of a sequence of events to be executed by the plurality of resources can be utilized to determine similarities between the plurality of resources in the cloud environment. Determining an anomaly score for the sequence of events being executed by the resource can be based on the probability of the sequence of events being executed by the resource and the probability of the sequence of events being executed by one or more similar resources. The steps can further include providing a graphical representation of the similarities between the plurality of resources in the cloud environment. The steps can further include performing inline monitoring of the cloud environment, wherein the inline monitoring includes collecting real-time resource activity data; determining an anomaly score for a sequence of events executed by a resource; and sending an alert based on the anomaly score being below a threshold. The resource activity data can include any of a source Internet Protocol (IP) address, an event time, and an event name.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   collecting resource activity data at a cloud edge via in-line real time monitoring from a plurality of resources in a cloud environment, the resource activity data including information related to a plurality of events associated with the plurality of resources in the cloud environment;
   aggregating and performing one or more calculations on the resource activity data to represent the plurality of resources in vector form, wherein the aggregating is performed via a supervised Machine Learning (ML) model and includes grouping the plurality of events into a plurality of triples, wherein each of the plurality of triples includes 3 events executed by a resource of the plurality of resources in sequence;
   determining a probability of a sequence of events to be executed by a resource of the plurality of resources based on the vector form of the resource; and
   determining an anomaly score for the sequence of events being executed by the resource based on the probability.

2. The method of claim 1, wherein the collecting resource activity data is performed for a preconfigured historical time span based on a training set period, and wherein the resource activity data is provided to the ML model for training.

3. The method of claim 1, wherein the one or more calculations include calculating a number of occurrences that each of the plurality of resources executed each of the plurality of triples.

4. The method of claim 3, wherein the sequence of events is a triple, and wherein determining the probability of the triple to be executed by the resource is based on the number of occurrences that the resource executed the triple.

5. The method of claim 1, wherein the probability of a sequence of events to be executed by the plurality of resources is utilized to determine similarities between the plurality of resources in the cloud environment.

6. The method of claim 5, wherein determining an anomaly score for the sequence of events being executed by the resource is based on the probability of the sequence of events being executed by the resource and the probability of the sequence of events being executed by one or more similar resources.

7. The method of claim 5, wherein the steps further comprise:
   providing via a Graphical User Interface (GUI) a graphical representation of the similarities between the plurality of resources in the cloud environment, wherein the GUI is adapted for a user to configure policies.

8. The method of claim 1, wherein the steps further comprise:
   performing inline monitoring of the cloud environment, wherein the inline monitoring includes collecting real-time resource activity data;
   determining an anomaly score for a sequence of events executed by a resource; and
   sending an alert based on the anomaly score being below a threshold.

9. The method of claim 1, wherein the resource activity data includes any of a source Internet Protocol (IP) address, an event time, and an event name.

10. A non-transitory computer-readable medium comprising instructions that, when executed, cause one or more processors to perform steps of:
    collecting resource activity data at a cloud edge via in-line real time monitoring from a plurality of resources in a cloud environment, the resource activity data including information related to a plurality of events associated with the plurality of resources in the cloud environment;
    aggregating and performing one or more calculations on the resource activity data to represent the plurality of resources in vector form, wherein the aggregating is performed via a supervised Machine Learning (ML) model and includes grouping the plurality of events into a plurality of triples, wherein each of the plurality of triples includes 3 events executed by a resource of the plurality of resources in sequence;
    determining a probability of a sequence of events to be executed by a resource of the plurality of resources based on the vector form of the resource; and
    determining an anomaly score for the sequence of events being executed by the resource based on the probability.

11. The non-transitory computer-readable medium of claim 10, wherein the collecting resource activity data is performed for a preconfigured historical time span.

12. The non-transitory computer-readable medium of claim 10, wherein the one or more calculations include calculating a number of occurrences that each of the plurality of resources executed each of the plurality of triples.

13. The non-transitory computer-readable medium of claim 12, wherein the sequence of events is a triple, and wherein determining the probability of the triple to be executed by the resource is based on the number of occurrences that the resource executed the triple.

14. The non-transitory computer-readable medium of claim 10, wherein the probability of a sequence of events to be executed by the plurality of resources is utilized to determine similarities between the plurality of resources in the cloud environment.

15. The non-transitory computer-readable medium of claim 14, wherein determining an anomaly score for the sequence of events being executed by the resource is based on the probability of the sequence of events being executed by the resource and the probability of the sequence of events being executed by one or more similar resources.

16. The non-transitory computer-readable medium of claim 14, wherein the steps further comprise:
providing a graphical representation of the similarities between the plurality of resources in the cloud environment.

17. The non-transitory computer-readable medium of claim 10, wherein the steps further comprise:
performing inline monitoring of the cloud environment, wherein the inline monitoring includes collecting real-time resource activity data;
determining an anomaly score for a sequence of events executed by a resource; and
sending an alert based on the anomaly score being below a threshold.

18. The non-transitory computer-readable medium of claim 10, wherein the resource activity data includes any of a source Internet Protocol (IP) address, an event time, and an event name.

* * * * *